(12) United States Patent
Eis et al.

(10) Patent No.: US 9,194,170 B2
(45) Date of Patent: Nov. 24, 2015

(54) JAMB INSTALLATION DEVICE AND METHOD

(71) Applicant: Therma-Tru Corp., Maumee, OH (US)

(72) Inventors: Scott B. Eis, Holgate, OH (US); Seth Gillen, Hamilton, IN (US); Thomas A. Topp, Albion, IN (US); Caleb A. Ziebold, Defiance, OH (US)

(73) Assignee: Therma-Tru Corp., Maumee, OH (US)

( * ) Notice: Subject to any disclaimer, the term of this patent is extended or adjusted under 35 U.S.C. 154(b) by 0 days.

(21) Appl. No.: 14/212,558

(22) Filed: Mar. 14, 2014

(65) Prior Publication Data
US 2014/0260008 A1    Sep. 18, 2014

Related U.S. Application Data

(60) Provisional application No. 61/788,806, filed on Mar. 15, 2013.

(51) Int. Cl.
*E06B 1/04* (2006.01)
*E06B 1/60* (2006.01)

(52) U.S. Cl.
CPC ............ *E06B 1/603* (2013.01); *E06B 1/6053* (2013.01); *E06B 1/6076* (2013.01)

(58) Field of Classification Search
CPC .......... E06B 1/62; E06B 1/52; E06B 1/6015; E06B 1/20; E06B 1/08; E06B 1/04; E06B 1/10; E06B 1/6046; E06B 1/603; E06B 1/6076; E06B 1/6053; E04F 21/0007
See application file for complete search history.

(56) References Cited

U.S. PATENT DOCUMENTS

| | | | | |
|---|---|---|---|---|
| 2,595,506 A * | 5/1952 | Backman | ............... | 52/127.12 |
| 3,685,226 A * | 8/1972 | Richter | ............... | 52/217 |
| 4,453,346 A * | 6/1984 | Powell et al. | ............... | 49/404 |
| 5,655,343 A * | 8/1997 | Seals | ............... | 52/217 |
| 5,758,458 A * | 6/1998 | Ridge | ............... | 52/204.1 |
| 6,167,663 B1 * | 1/2001 | Nakamoto et al. | ............... | 52/217 |
| 6,308,476 B1 * | 10/2001 | Nakamoto et al. | ............... | 52/217 |
| 6,826,878 B1 * | 12/2004 | Rovtar | ............... | 52/213 |
| 7,987,637 B2 * | 8/2011 | Smith | ............... | 52/126.1 |
| 2001/0023557 A1 * | 9/2001 | Graham | ............... | 49/504 |
| 2003/0046885 A1 * | 3/2003 | Tavivian | ............... | 52/204.1 |
| 2010/0212239 A1 * | 8/2010 | Wang | ............... | 52/217 |

OTHER PUBLICATIONS

Popular Mechanics, Sep. 1985 pp. 53-54.
Popular Mechanics, Apr. 1988, pp. 97, 98 and 100.

* cited by examiner

*Primary Examiner* — Brian Glessner
*Assistant Examiner* — Gisele Ford
(74) *Attorney, Agent, or Firm* — Calfee, Halter & Griswold LLP

(57) ABSTRACT

Provided herein are devices for installing jamb assemblies and like structures within a rough opening. In certain embodiments, the installation device comprises a guide portion attached to a jamb assembly and a spacer portion operatively connected to the guide portion and configured to selectively move relative to the guide portion to provide adjustment of the jamb assembly relative to the rough opening.

12 Claims, 42 Drawing Sheets

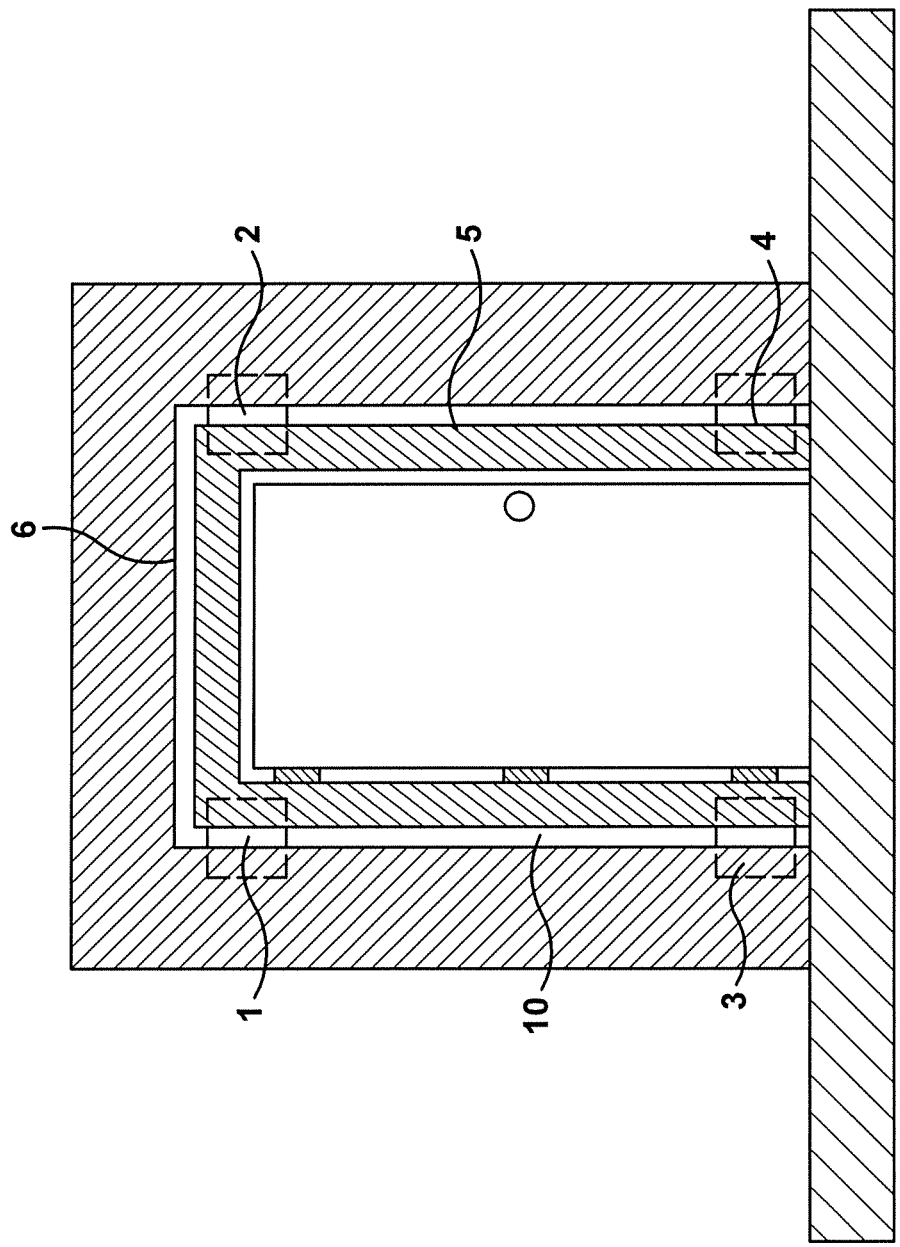

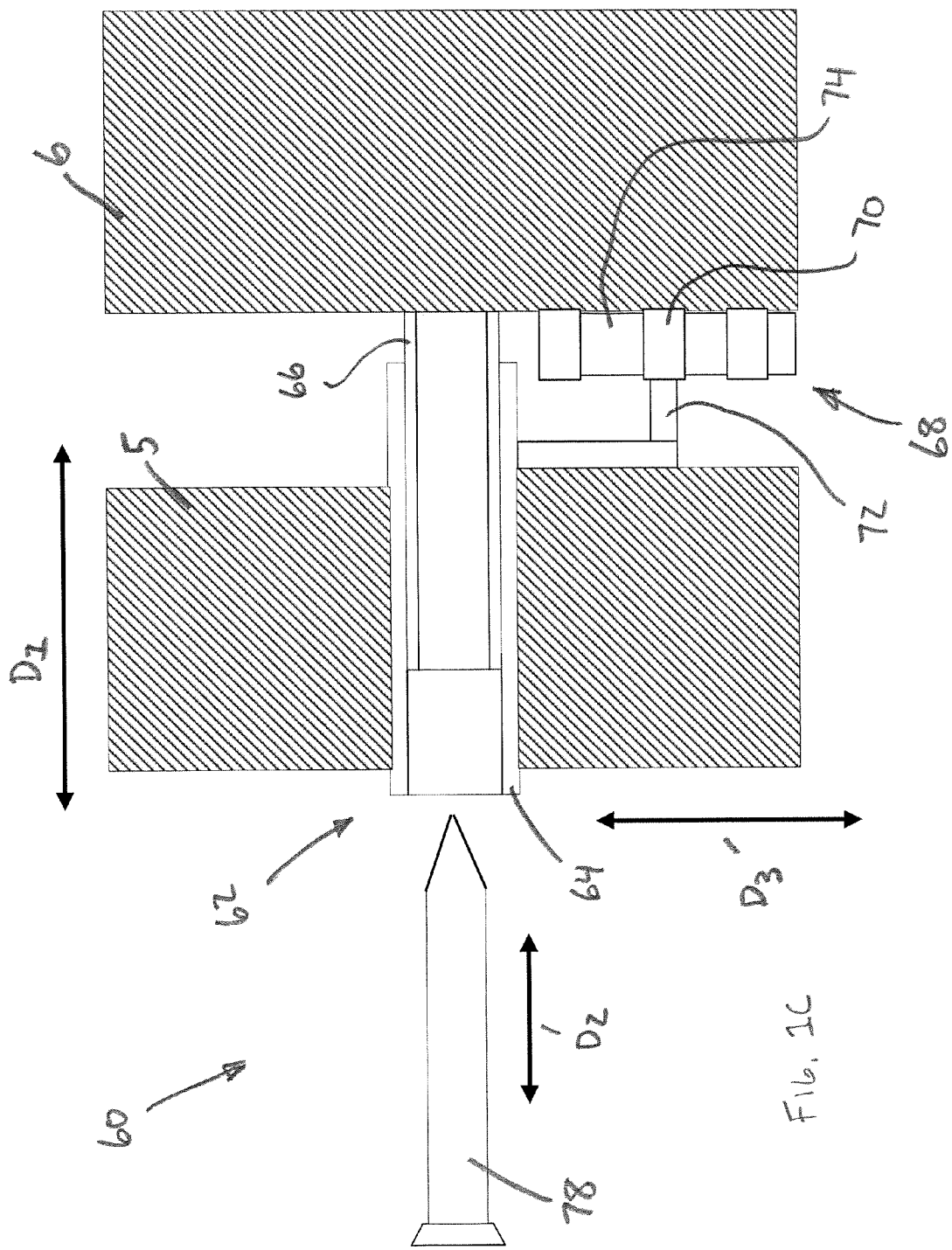

JAMB INSTALLATION DEVICE AND METHOD

CROSS REFERENCE TO RELATED APPLICATION

This application is a U.S. Non-Provisional Patent Application which claims priority to U.S. Provisional Patent Application No. 61/788,806, filed on Mar. 15, 2013 and titled "Door Installation Hardware," which is hereby incorporated by reference in its entirety

TECHNICAL FIELD

The present application is in the field of construction, and more particularly in the field of devices for adjusting and aligning a jamb assembly within a structural opening and/or with another jamb assembly.

BACKGROUND

Pre-hung windows and doors are conventionally installed via a "shim and fastener" methodology. Generally, in operation, this process involves placing the jamb assembly (including the window or door frame) within the rough opening in the structure, then adjusting the jamb assembly within the opening so that the jamb assembly is plum, level, and aligned with walls of the building by inserting a series of shims at various points around the frame. This is performed iteratively at several points until the user is satisfied with the alignment. Once aligned and plum, the user then drives a fastener through the shims, and into a framing member (stud) that makes up the rough opening. The fastener holds the shims in place and secures the window or door within the opening. The user then trims the shims so that they do not protrude from the wall and provides a finish over the remainder of the rough opening. However, this conventional method can be time consuming and not particularly user-friendly for the non-professional. Further, due to heat-cold cycling and changes in humidity and weather throughout the year, structures distort over time. This distortion can affect the alignment of, for example, a door relative to the remainder of the structure, preventing the door from operating smoothly. Should a window or door that was installed using the "shim and fastener" method become misaligned, it generally cannot be realigned without essentially starting the entire alignment process over from the start.

SUMMARY

Provided herein are devices, systems and methods for installing jamb assemblies and like structures within a rough opening. By the use of these devices and systems, a door jamb can be adjusted until it is in square, plumb, and aligned with a structural opening.

In certain embodiments, a jamb assembly installation device comprises a guide portion attached to a jamb assembly and a spacer portion operatively connected to the guide portion and configured to selectively move relative to the guide portion to provide adjustment of an outside facing surface of the jamb assembly in a direction away from a rough opening.

In certain embodiments, a jamb assembly installation device comprises a first and second adjustment portion. The first adjustment portion comprises a first guide attached to a jamb assembly and a spacer operatively connected to the first guide and configured to selectively move relative to the first guide to provide adjustment of the jamb assembly in a first direction relative to a rough opening. The second adjustment portion comprises a second guide configured to engage a member extending from the jamb assembly to move the jamb assembly in a second direction relative to the rough opening while still permitting movement of the jamb assembly in a first direction relative to the rough opening. The second adjustment portion comprises an adjustment member attached to the rough opening that is operatively connected to the second guide and configured to selectively move the second guide in the second direction relative to the rough opening.

In certain embodiments, the installation device comprises a threaded guide and a spacer configured to selectively move relative to the threaded guide to adjust the jamb assembly relative to the rough opening. The threaded guide generally has a hollow open ended cylinder with a threaded inner surface. The spacer generally has a hollow open ended cylinder with a threaded outer surface adapted to engage the threaded inner surface of the threaded guide when extended therethrough.

In certain embodiments, the installation device comprises a jamb bracket attached to the jamb assembly and a frame bracket attached to the rough opening. The jamb and frame brackets are configured to selectively move the jamb assembly relative to the rough opening. The jamb bracket generally comprises a mating element, a jamb contact member, and a threaded guide adapted to receive a spacer therethrough. The spacer comprises an open ended hollow cylinder with a threaded outer surface. The frame bracket generally comprises a base member, a threaded member, at least one threaded member retainer extending from the base member, a traversing member having a threaded inner surface adapted to threadably engage the threaded member, and a mating tab adapted for mating with the mating element of the jamb bracket. The threaded member is configured to rotate about a traversing member path. The traversing member moves along the traversing member path as the threaded member rotates.

In certain embodiments, the method for aligning and securing a jamb assembly within a rough opening comprises positioning a threaded guide at a rough opening end of a clearance hole disposed in a jamb assembly. The jamb assembly is aligned within a rough opening and a spacer is extended at least partially through the threaded guide and into contact with the rough opening. The method may include providing the clearance hole in the jamb assembly and extending a fastener through the spacer and into a framing member of the rough opening.

These and additional embodiments will become apparent in the course of the following detailed description.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of the inventions.

FIG. 1A shows a front view of a jamb assembly (including a door) positioned within a rough opening of a structure.

FIG. 1C schematically illustrates a top plan cross-sectional view of a jamb installation device according to an embodiment of the present application.

DETAILED DESCRIPTION

Figure 1B:
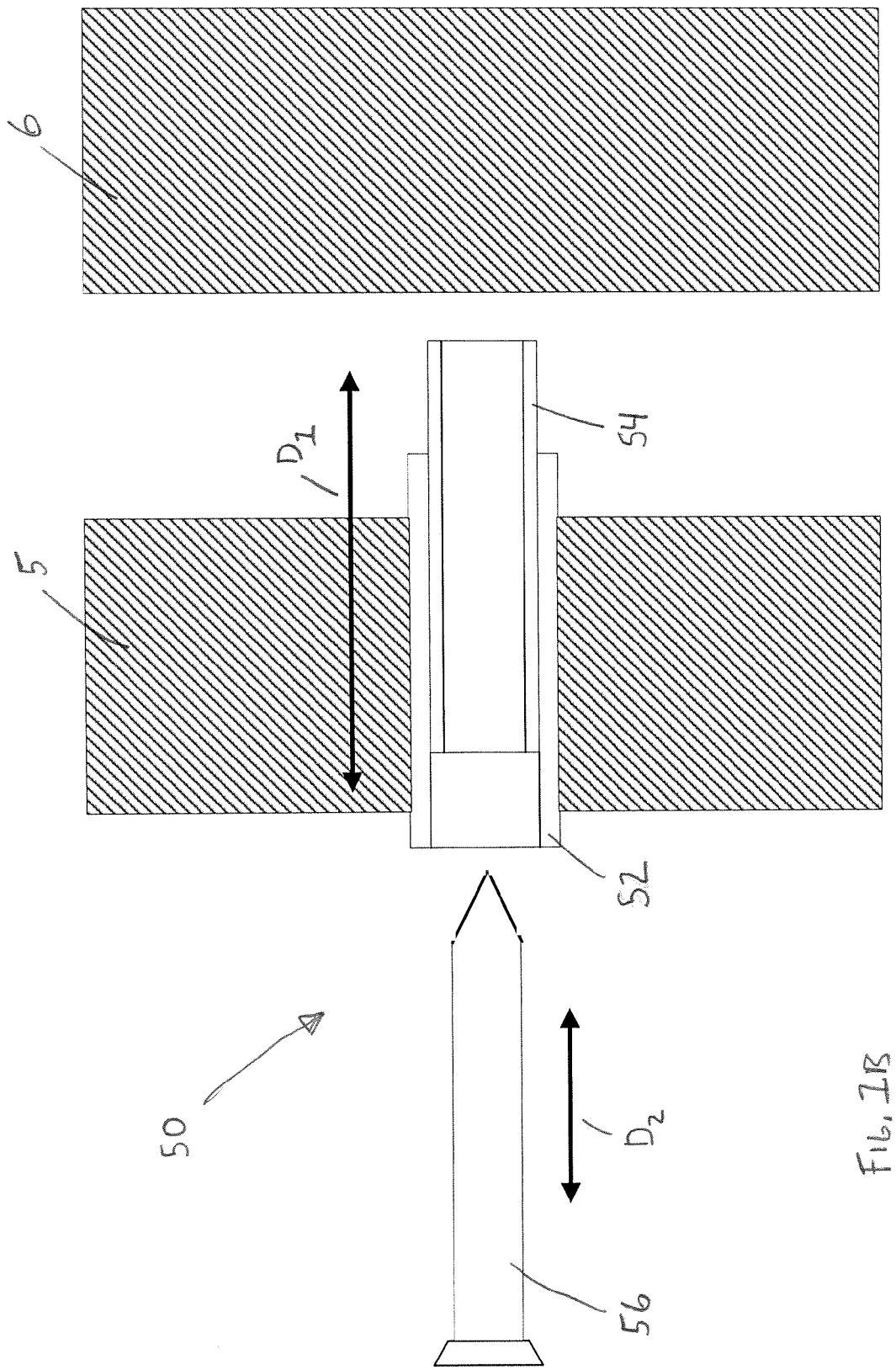
FIG. 1B schematically illustrates a jamb installation device according to an embodiment of the present application.

Provided herein are devices and methods for the installation of jamb assemblies within a structural opening. The installation devices of the present application may be comprised of any durable material, including but not limited to metals and plastics.

While the embodiments disclosed herein are applicable to the installation of a variety of building features such as windows, skylights, etc., for the purposes of brevity, the following description will focus mainly on uses associated with the installation of doors. The term "jamb assembly" as used herein refers to a jamb for a door, window, skylight, door and sidelight combination or other pre-assembled building feature comprised of an external frame, that requires installation in a wall opening (also referred to as a rough opening). Further, it should be understood that when discussing a jamb assembly, the outside facing surface refers to the perimeter of the jamb assembly that faces the rough opening, and is opposite the portion of the jamb assembly where the building feature (i.e., door, window, etc.) will lie. The term "rough opening" and "structural opening" are used interchangeably herein, refer to an opening in a wall or other portion of a structure intended for the framing or attachment (or both) of a building feature such as a door, window or the like.

The installation devices of the present application facilitate alignment and securement of a jamb assembly within a rough opening. In certain embodiments, the installation device of the present application provides adjustment of the outside facing surface of the jamb assembly in a direction toward or away from the rough opening. Further, the installation device of the present application may additionally provide adjustment of the outside facing surface of the jamb assembly in a direction parallel to the rough opening (i.e., in and out of the rough opening).

Referring now to the drawings, FIG. 1A illustrates a jamb assembly 5 positioned in a rough opening 6. Near the four corners of the jamb assembly 5 are regions 1-4 where devices of the present application may be installed for adjusting the gap 10 around the jamb assembly within the rough opening 6. However, it should be understood that the devices of the present application may be installed at any location around the jamb assembly 5 to adjust the gap 10 around the jamb assembly within the rough opening 6. Further, the devices of the present application may be included with the jamb assembly as a system.

FIG. 1B schematically illustrates a top cross sectional view of an installation device 50 according to an embodiment of the present application. As shown, the installation device 50 comprises a guide portion 52 that is attached to the jamb assembly 5 and a spacer portion 54 that is operatively connected to the guide portion and configured to selectively move relative to the guide portion in a direction $D_1$. As shown, the spacer portion 54 extends from the installation device 50 to contact the rough opening 6 and move the jamb assembly 5 in a direction $D_1$ relative to the rough opening. Thus, the installation device 50 provides adjustment of the outside facing surface of the jamb assembly 5 in a direction toward or away from the rough opening 6.

Once the jamb assembly 5 is satisfactorily positioned relative to the rough opening 6, a fastener 56 may be used with the device 50 to secure the jamb assembly to the rough opening. As shown, the fastener 56 is moved in a direction $D_2$ through the spacer portion 54 and into the rough opening 6 to secure the jamb assembly 5 to the rough opening. In certain embodiments, the head of the fastener 56 contacts the spacer portion 54 such that the jamb assembly 5 is prohibited from moving away from the rough opening 6. Further, in certain embodiments, the interior surface of the spacer portion 54 is threaded and configured to mate with a threaded portion of a fastener to prohibit movement of the jamb assembly 5 relative to the rough opening 6.

The guide portion 52 may be attached to the jamb assembly 5 in a variety of different ways. For example, the guide portion 52 may be secured within an opening of the jamb assembly 5 or to a face of the jamb assembly. Fasteners, such as screws or nails, may be used to secure the guide portion 52 to the jamb assembly 5. In certain embodiments, the guide portion 52 is press fit into an opening of the jamb assembly 5. Further, the guide portion 52 may comprise features that prohibit the guide portion from moving relative to the jamb assembly 5. For example, the outer surface of the guide portion 52 may be threaded or the comprise features, such as ridges or barbs, that prohibit movement of the guide portion within an opening of the jamb assembly 5. The guide portion 52 may also be shaped such that it does not rotate with an opening of the guide portion. For example, the cross sectional shape of the guide portion 52 may be non-circular, e.g., square, triangle, pentagon, etc., such that the guide portion does not rotate within an opening of the jamb assembly 5.

The installation device 50 may be configured in a variety of ways to permit selective movement of the spacer portion 54 relative to the guide portion 52. For example, the portions 52 and 54 may comprise features that permit selective movement of the spacer portion relative to the guide portion. These features may include, for example, a track and guide, ridges and grooves, rack and pinion, detents, threads, friction fit, or the like. In certain embodiments, the installation device 50 comprises a threaded guide portion 52 and a spacer portion 54 configured to selectively move relative to the threaded guide portion to adjust the jamb assembly 5 relative to the rough opening 6. The threaded guide portion 52 has a hollow open ended cylinder with a threaded inner surface or inner diameter. The spacer portion 54 has a hollow open ended cylinder with a threaded outer surface or outer diameter adapted to engage the threaded inner surface of the threaded guide portion 52 when extended therethrough.

Figure 2:
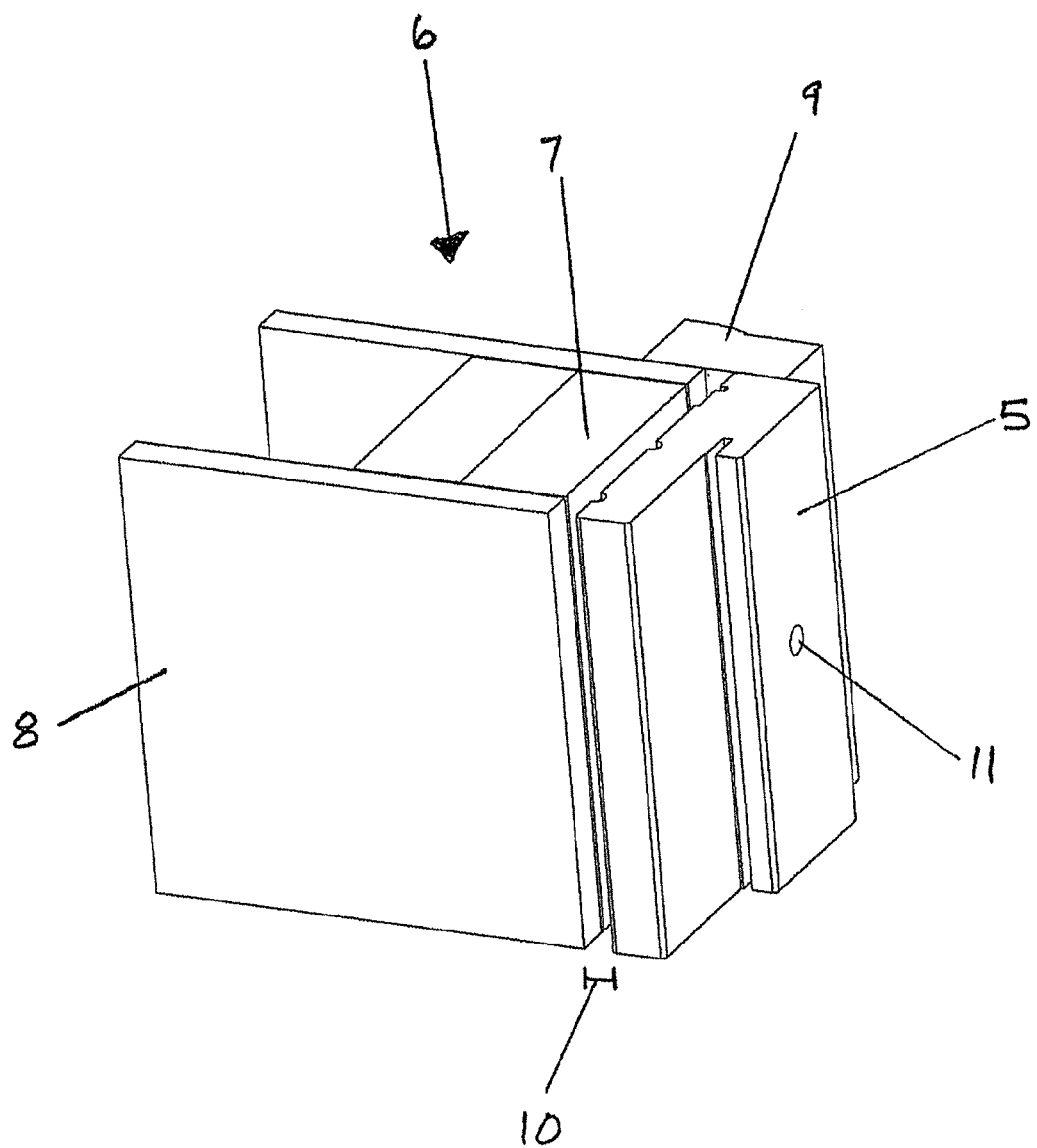
FIG. 2 shows a perspective view of a section of a jamb assembly positioned in a rough opening of a structure according to an exemplary embodiment.
Figure 3:
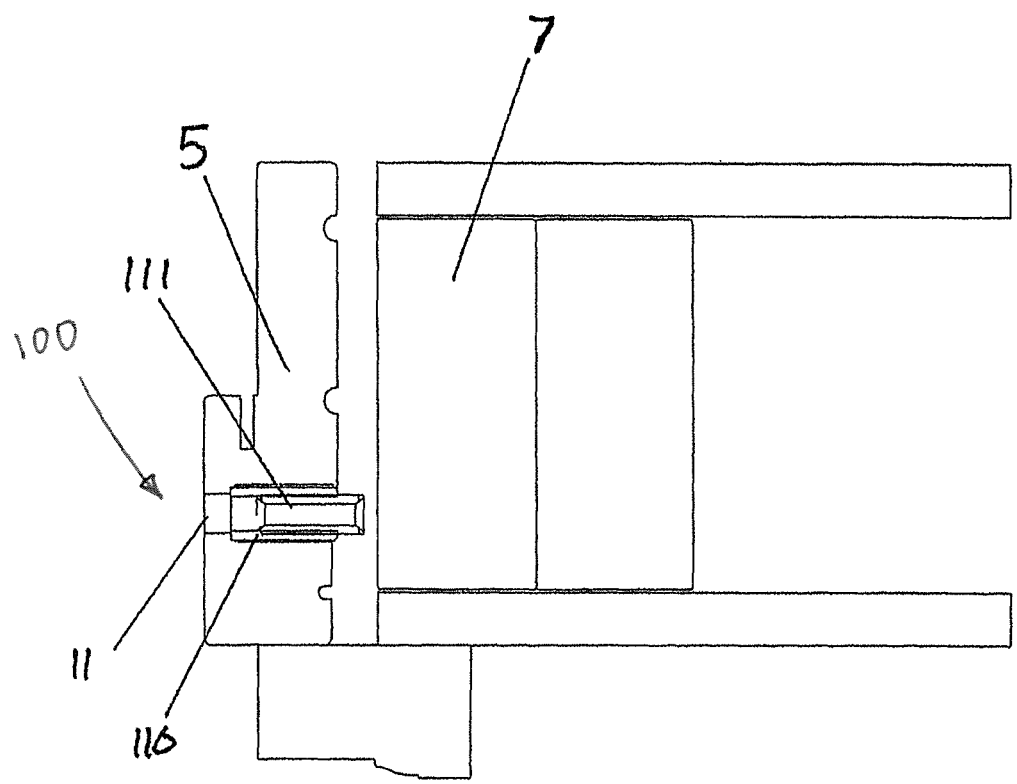
FIG. 3 shows a cross-sectional view of the embodiment shown in FIG. 2 with an exemplary embodiment of an installation device for aligning and securing a jamb assembly positioned in the jamb assembly.
Figure 4:
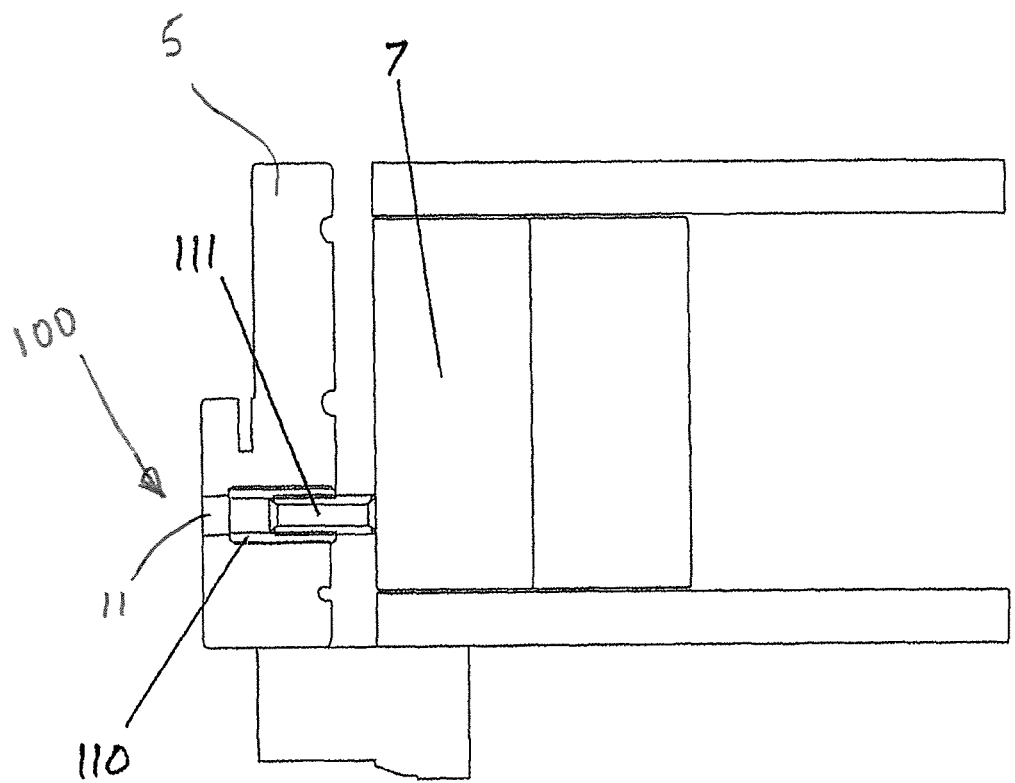
FIG. 4 shows a further view of the section shown in FIG. 3, wherein a spacer of the installation device has been threaded to engage a surface of a framing member.

FIG. 2 shows a portion of the jamb assembly 5 positioned proximate to a portion of rough opening 6. The rough opening 6 includes framing members 7 and paneling 8. Further, brick molding 9 and/or other trim is positioned on one side of the opening, obscuring one side of the gap 10 between the rough opening 6 and the jamb assembly 5. As illustrated in FIG. 2, when utilizing a device of the present application, the jamb assembly 5 is positioned in the rough opening 6 and, in certain embodiments, a clearance hole 11 is provided in the jamb assembly.

FIGS. 3-8 illustrate a device 100 for installing jamb assemblies and like structures within a rough opening according to an embodiment of the present application. By the use of the device 100, a door jamb can be adjusted until it is in square, plumb, and aligned with a structural opening. As illustrated in FIGS. 3-8, a threaded guide 110 of the device 100 is placed in the clearance hole 11. In certain embodiments, the threaded guide 110 is an open-ended hollow cylinder with a threaded inner diameter. Once the jamb assembly 5 is positioned within the rough opening 6, a spacer 111 of the device 100 is inserted through the clearance hole 11 and extends into the threaded guide 110. In certain embodiments, the spacer 111 has a threaded outer diameter and threadably engages with the threaded inner diameter of the threaded guide 110. In such embodiments, the outer diameter of the guide 110 has a profile that resists rotation within the clearance hole 11, allowing the spacer 111 to be positioned without displacing the threaded guide within the clearance hole.

As illustrated in FIGS. 4-8, the spacer 111 is threaded through the guide 110 and into contact with a framing member 7. In certain embodiments, the spacer 111 is an open-ended hollow cylinder with an inner diameter adapted to allow a portion of a fastener (e.g., a screw or nail) to pass through. The spacer 111 may be configured to prohibit the entire length of the fastener from passing through the spacer. In certain embodiments, an end of the spacer 111 is adapted to prevent an entire length of a fastener from extending through the inner diameter of the spacer. For example, the end of the spacer 111 that remains within the clearance hole 11 after the spacer is adjusted into contact with the framing member 7 may have a diameter that is less than the head of the fastener. The process of threading the spacer 111 through the threaded guide 110 is repeated for each device utilized, generally for the four regions shown in FIG. 1A, until the jamb assembly 5 is aligned and plumb within the rough opening 6.

Figure 5:
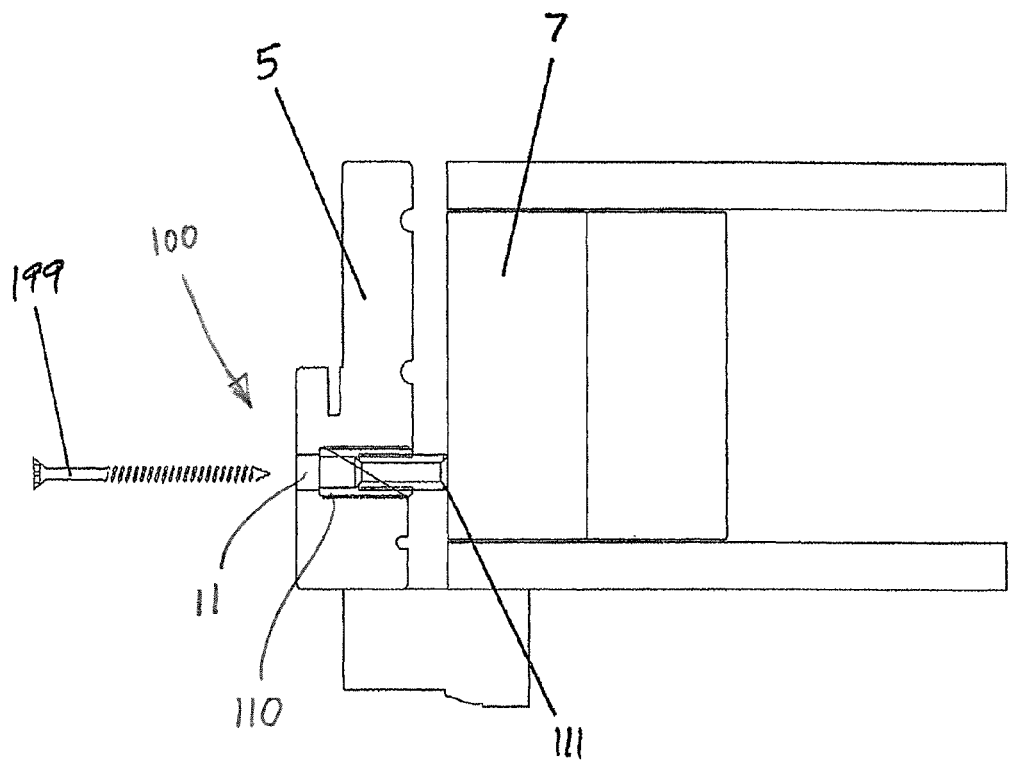
FIG. 5 shows a further view of the embodiment shown in FIG. 4, wherein a fastener is positioned to secure the jamb assembly to the framing member of the rough opening.
Figure 6:
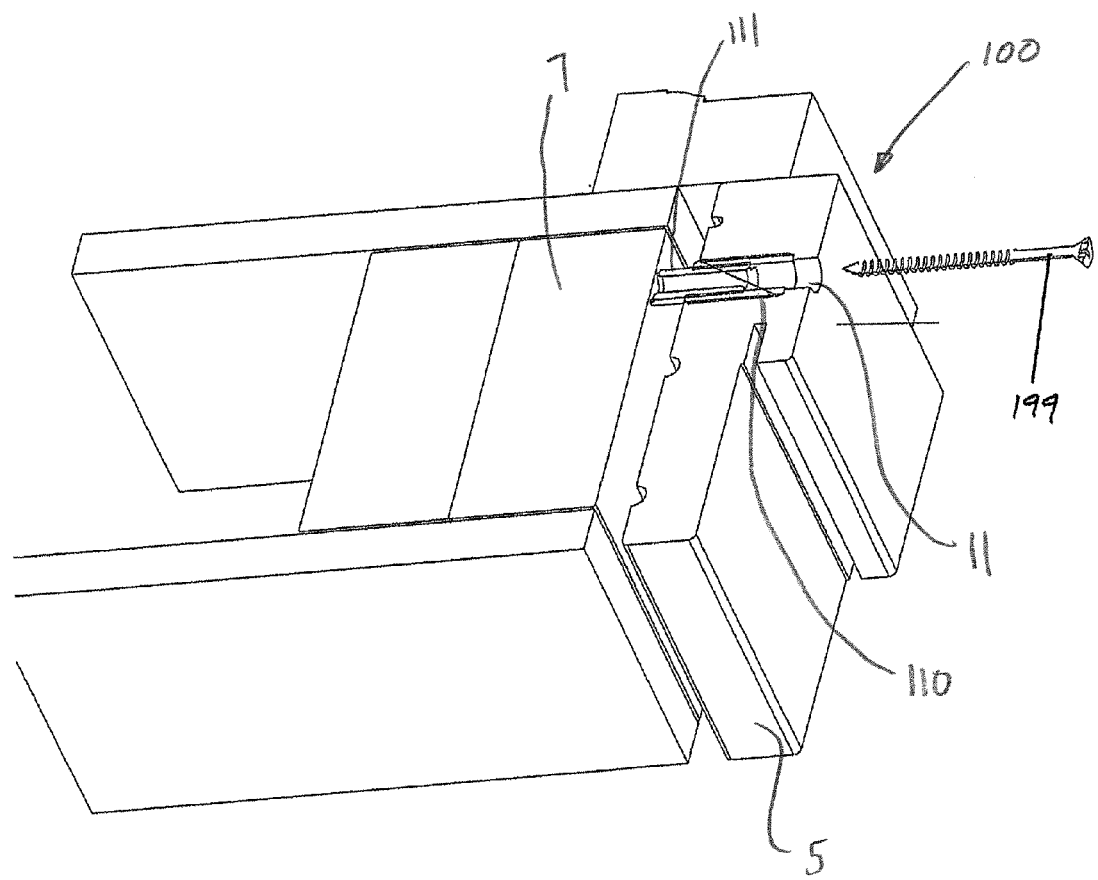
FIG. 6 shows a perspective view of the embodiment shown in FIG. 5.
Figure 7:
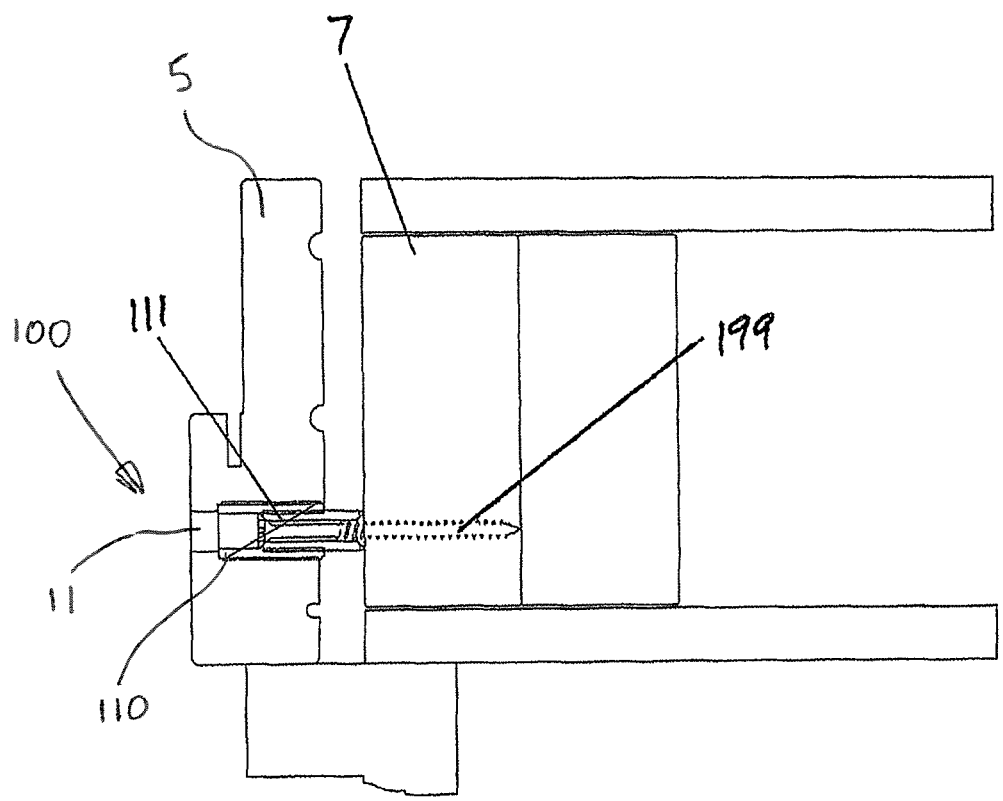
FIG. 7 shows a further view of the embodiment shown in FIG. 5, wherein the fastener is extended through the spacer aligning and securing the jamb assembly in the rough opening.
Figure 8:
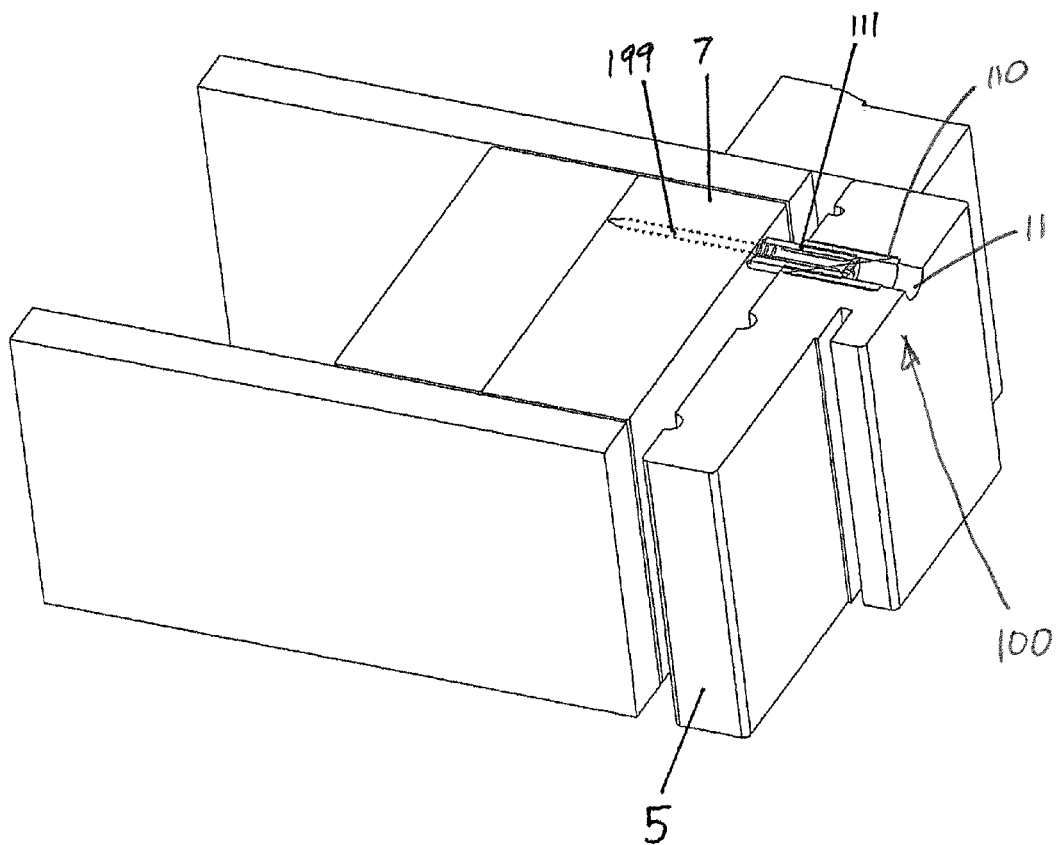
FIG. 8 shows a perspective view of the embodiment shown in FIG. 7.

As illustrated in FIGS. 5-8, once the jamb assembly 5 is satisfactorily aligned, a fastener 199 is utilized to secure the jamb assembly 5 in position. FIG. 5 is a cross-sectional view showing the fastener 199 (here a woodscrew) positioned for securing the jamb assembly 5 to the framing member 7 after the spacer 111 has engaged the framing member. FIG. 6 shows another cross-sectional view of the fastener 199 in position for securing the jamb assembly 5. FIG. 7 shows a top cross-sectional view, wherein the jamb assembly 5 is substantially aligned and plumb within the rough opening 6 and secured in place with the fastener 199. The fastener 199 extends through the spacer 111 and into the framing member 7. FIG. 8 shows another cross-sectional view of the jamb assembly 5 secured to the framing member 7 by the fastener 199 that extends through the spacer 111 and into the framing member 7.

Figure 9:
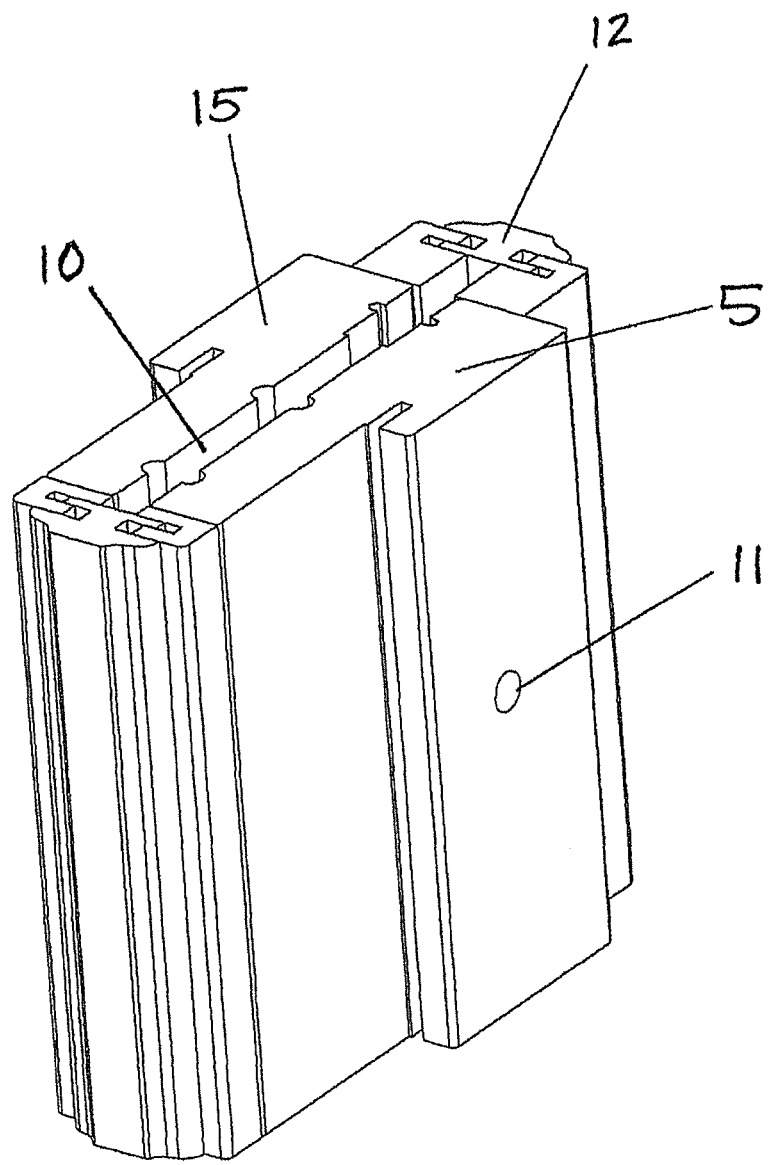
FIG. 9 shows a perspective view of back to back jamb assemblies according to an exemplary embodiment, wherein a clearance hole is provided in one of the jamb assemblies.

FIG. 9 is a perspective view of a back-to-back jamb assembly for use when, for example, the assembly includes double doors (e.g., French doors) that are attached together, or doors with a sidelight attached. In such embodiments, the gap 10 that is adjusted is between jambs 5 and 15, rather than between a jamb and a rough opening. In FIG. 9, a clearance hole 11 has been made in the jamb assembly 5 for aligning it with the secondary jamb assembly 15. Further, a mull cap 12 is positioned at either end of the gap 10 between the jambs 5 and 15.

Figure 10:
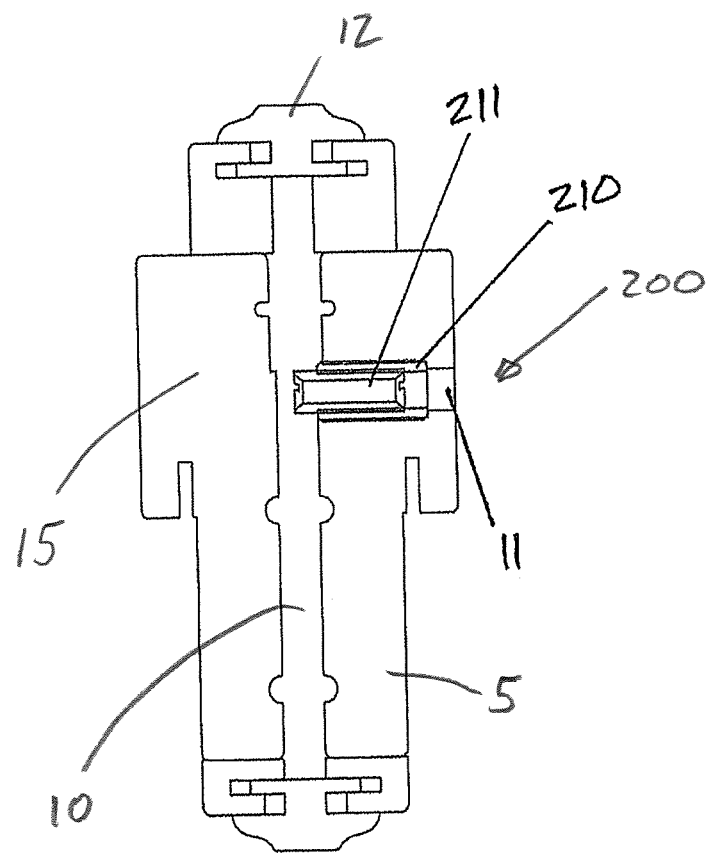
FIG. 10 shows a cross-sectional view of the back-to-back jamb assembly of FIG. 9 with an exemplary embodiment of an installation device for aligning and securing a jamb assembly positioned in the clearance hole.

FIGS. 10-13 illustrate a device 200 for installing and adjusting back-to-back jamb assemblies. FIG. 10 shows a top view of a cross-section of the back-to-back jamb assemblies shown in FIG. 9. As shown, a threaded guide 210 of the device 200 is positioned within the clearance hole 11 and a spacer 211 is extended through the inner diameter of the threaded guide. In certain embodiments, the threaded guide 210 is an open-ended hollow cylinder with a threaded inner diameter. The outer diameter of the threaded guide 210 may have a cross-sectional profile such that it is resistant to rotation once it is positioned within the clearance hole 11.

In certain embodiments, the spacer 211 of the device 200 is an open-ended hollow cylinder with a threaded outer diameter and an inner diameter adapted to allow a portion of a fastener (e.g., a screw or nail) to pass through. The spacer 211 may be configured to prohibit the entire length of the fastener from passing through the spacer. In certain embodiments, an end of the spacer 211 may be adapted to prevent an entire length of a fastener from extending through the inner diameter of the spacer. For example, the end of the spacer 211 that remains within the clearance hole 11 after the spacer is adjusted into contact with the secondary jamb assembly 15 may have a diameter that is less than the head of the fastener.

Figure 11:
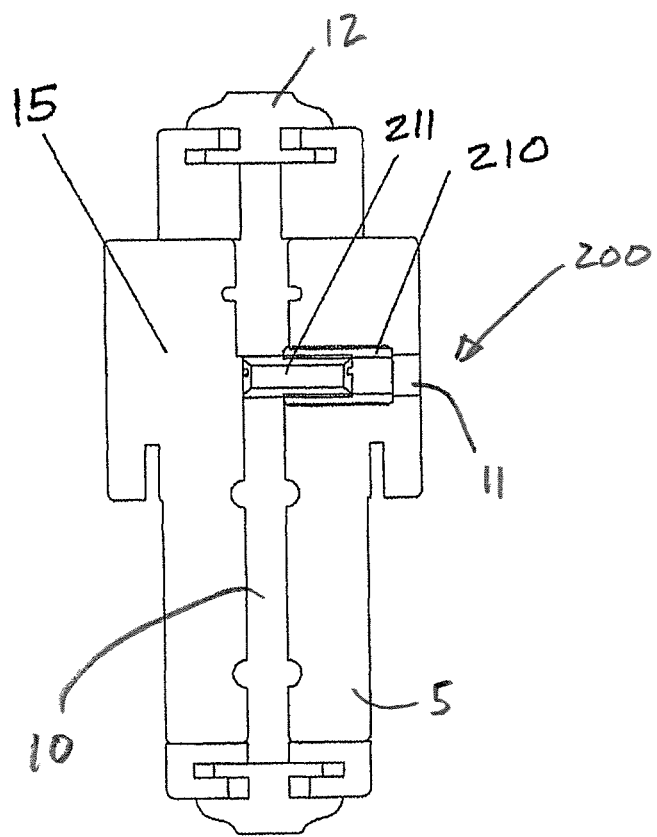
FIG. 11 shows a further view of the section shown in FIG. 10, wherein a spacer of the exemplary installation device has been extended through a threaded guide and into contact with a secondary jamb assembly.
Figure 12:
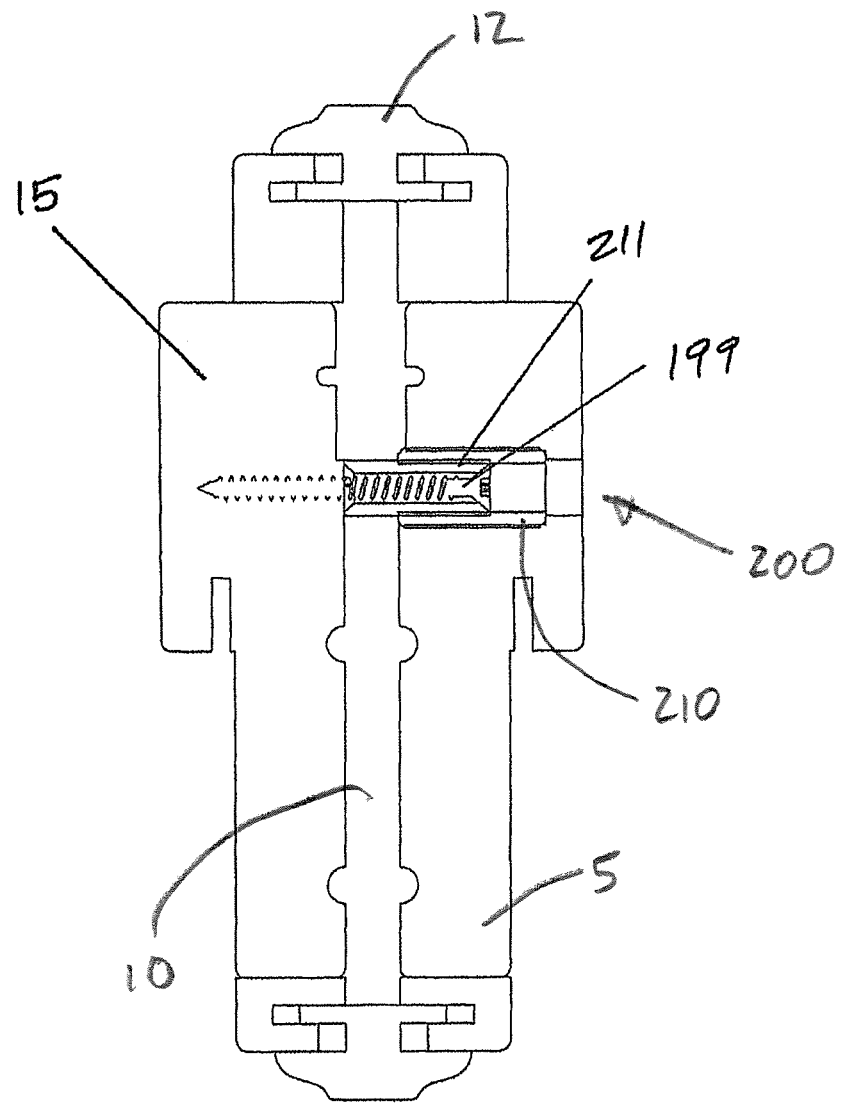
FIG. 12 shows a further view of the embodiment shown in FIG. 11, wherein a fastener has been extended through the spacer and into the secondary jamb assembly.
Figure 13:
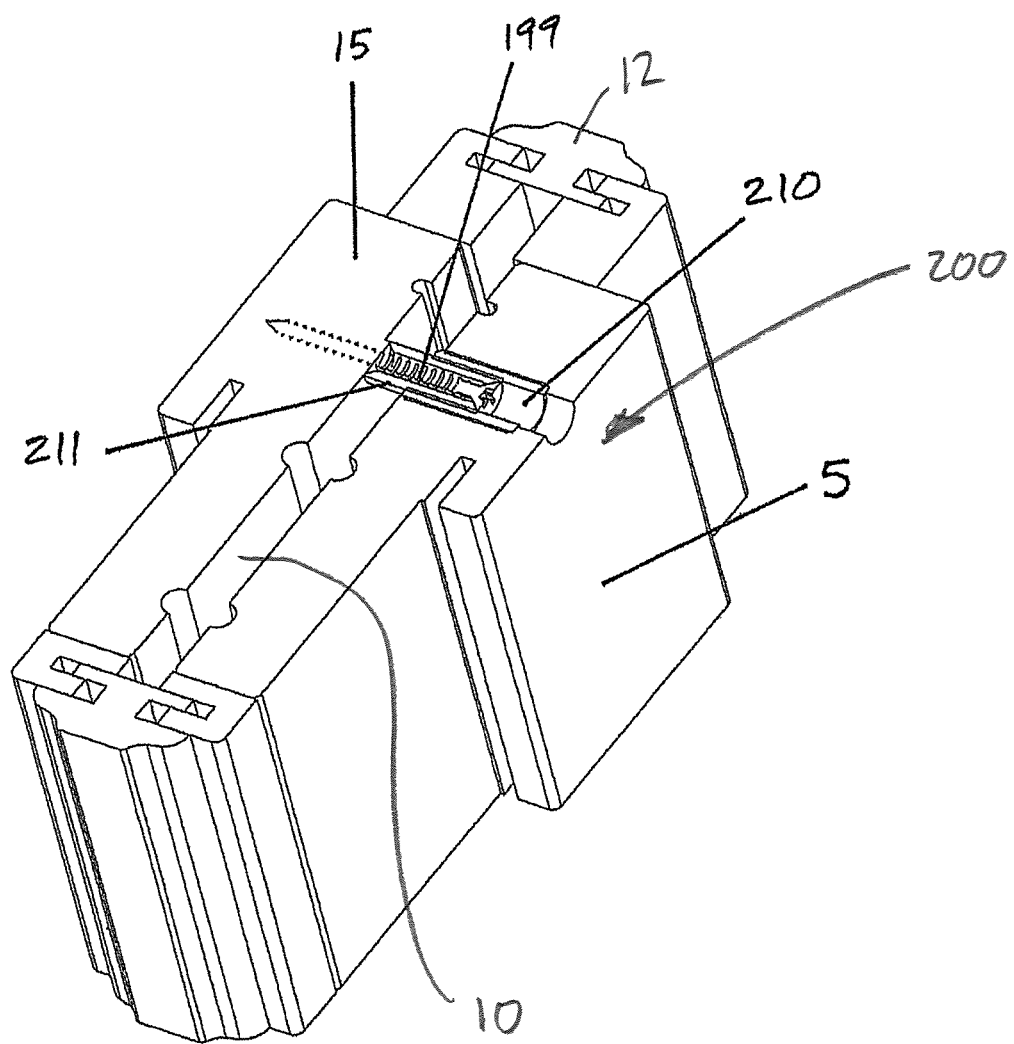
FIG. 13 shows a perspective view of an embodiment shown in FIG. 12.

When the spacer 211 has a threaded outer diameter, the spacer threadably engages with the inner diameter of threaded guide 210 when extended therethrough. FIG. 11 shows an embodiment where the spacer 211 is extended through the threaded guide 210 and into contact with the secondary jamb 15. The process of extending the spacer 211 through the respective threaded guides 210 is repeated for each device utilized to align the jamb and the secondary jamb assembly. FIGS. 12 and 13 shows the device with a fastener 199 extended through the threaded guide 210 and the spacer 211 and securing the jamb assembly 5 to the secondary jamb assembly 15.

FIG. 1C schematically illustrates a top cross sectional view of an installation device 60 according to an embodiment of the present application. Similar to the installation device 50 shown in FIG. 1B, the installation device 60 comprises a first adjustment portion 62 that facilitates movement of the jamb assembly 5 in a direction $D_1$ relative to the rough opening 6. The first adjustment portion 62 comprises a guide 64 that is attached to the jamb assembly 5 and a spacer 66 that is operatively connected to the guide and configured to selectively move relative to the guide in a direction $D_1$. The spacer 66 extends from the installation device 60 to contact the rough opening 6 and move the jamb assembly 5 in a direction $D_1$ relative to the rough opening.

Further, the installation device 60 comprises a second adjustment portion 68 that facilitates movement of the jamb assembly 5 in a direction $D_3$ relative to the rough opening 6. As shown, the second adjustment portion 68 comprises a guide 70 that engages a member 72 extending from the jamb assembly 5 to move the jamb assembly in a direction $D_3$ relative to the rough opening 6 while still permitting movement of the jamb assembly in the direction $D_1$ relative to the rough opening. Further, the second adjustment portion 68 comprises an adjustment member 74 attached to the rough opening 6 that is operatively connected to the guide 70 and configured to selectively move the guide in a direction $D_3$ relative to the rough opening. As such, movement of the guide 70 relative to the adjustment member 74 moves the jamb assembly 5 in a direction $D_3$ relative to the rough opening 6. Thus, the installation device 60 provides adjustment of the outside facing surface of the jamb assembly 5 in a direction toward or away from the rough opening 6 and also provides adjustment of the outside facing surface of the jamb assembly in a direction parallel to the rough opening (i.e., in and out of the rough opening).

The guide 70 of the second adjustment portion 68 may be configured to engage the member 72 extending from the jamb assembly 5 in a variety of different ways. For example, the guide 70 may comprise an extension that mates with or is received in an aperture, such as a slot, of the member 72 such that the member moves in the direction $D_3$ when the guide is selectively moved relative to the adjustment member 74. Further, an extension of the guide 70 may comprise an opening, such as a slot, that engages the member 72 extending from the jamb assembly 5 such that the member moves in the direction $D_3$ when the guide is selectively moved relative to the adjustment member 74.

The second adjustment portion 68 may be configured in a variety of ways to permit selective movement of the guide 70 relative to the adjustment member 74. For example, the adjustment member 74 and guide 70 may comprise features that permit selective movement of the guide relative to the adjustment member. These features may include, for example, a track and guide, ridges and grooves, rack and pinion, detents, threads, friction fit, or the like. In certain embodiments, the installation device 60 comprises a jamb bracket attached to the jamb assembly and a frame bracket attached to the rough opening. The jamb bracket comprises a mating element and the frame bracket comprises a base member, a threaded adjustment member, at least one threaded adjustment member retainer extending from the base member, a traversing guide member having a threaded inner diameter adapted to threadably engage the threaded adjustment member, and a mating tab extending from the traversing guide member and adapted for mating with the mating element of the jamb bracket. Movement of the traversing guide member relative to the threaded adjustment member in the direction $D_3$ moves the mating element and, in turn, the jamb assembly in the direction $D_3$.

Once the jamb assembly 5 is satisfactorily positioned relative to the rough opening 6, a fastener 78 may be used with the device 60 to secure the jamb assembly to the rough opening. As shown in FIG. 1C, the fastener 78 is moved in a direction $D_2$ through the spacer 66 and into the rough opening 6 to secure the jamb assembly 5 to the rough opening. In certain embodiments, the head of the fastener 78 contacts the spacer 66 such that the jamb assembly 5 is prohibited from moving away from the rough opening 6. Further, in certain embodiments, the interior surface of the spacer 66 is threaded and configured to mate with a threaded portion of a fastener to prohibit movement of the jamb assembly 5 relative to the rough opening 6.

Figure 1D:
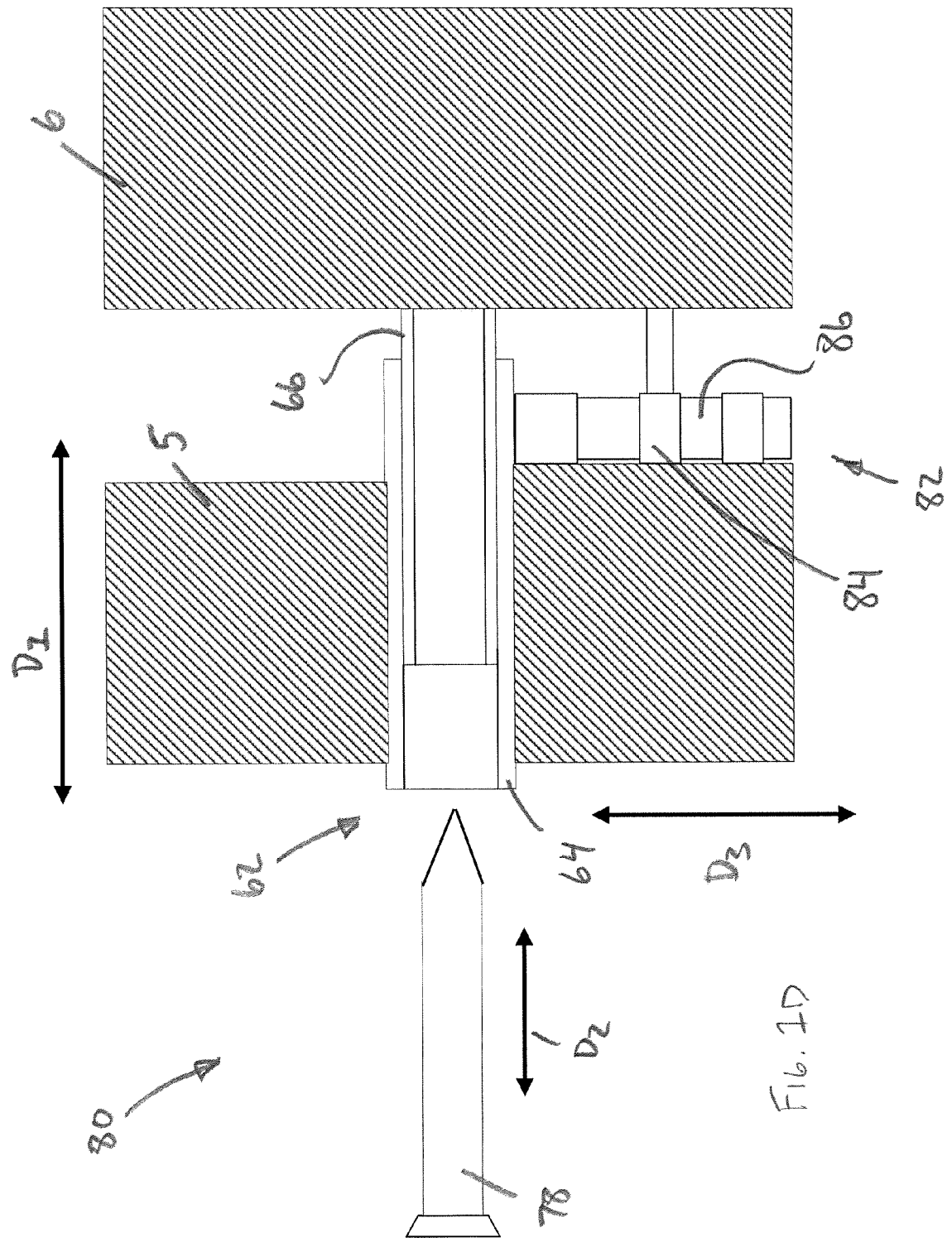
FIG. 1D schematically illustrates a top plan cross-sectional view of a jamb installation device according to an embodiment of the present application.

FIG. 1D is a top cross sectional view schematically illustrating another embodiment of an installation device 80 similar to installation device 60. The first adjustment portion of the device 80 is the same as the first adjustment portion 62 of the device 60. However, the second adjustment portion 82 of the device 80 comprises a guide 84 that engages a portion of the rough opening 6 such that it is prohibited from moving in a direction $D_3$ relative to the rough opening but still permits movement of the jamb assembly 5 in directions $D_1$ and $D_3$ relative to the rough opening. Further, the second adjustment portion 82 comprises an adjustment member 86 attached to the jamb assembly 5 that is operatively connected to the guide 84 and configured to selectively move relative to the guide in a direction $D_3$. As such, movement of the adjustment member 86 relative to the guide 84 moves the jamb assembly 5 in a direction $D_3$ relative to the rough opening 6.

Figure 14:
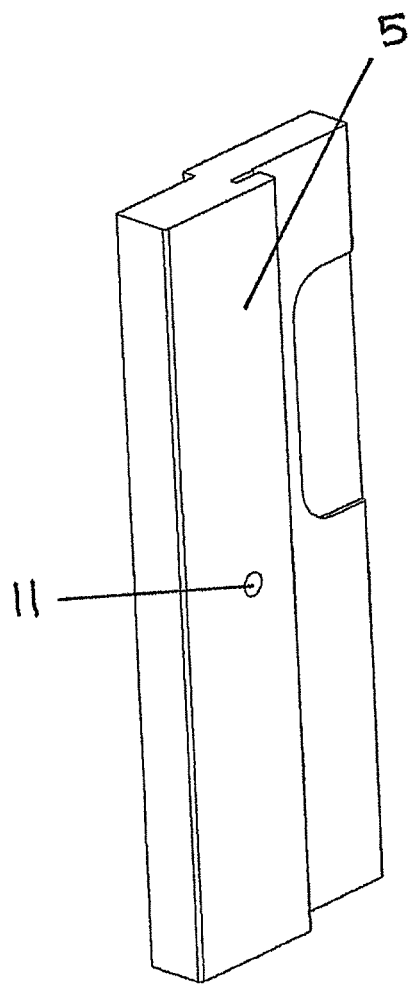
FIG. 14 shows a perspective view of a portion of a jamb assembly, the jamb assembly having a clearance hole provided through a thickness thereof.
Figure 15:
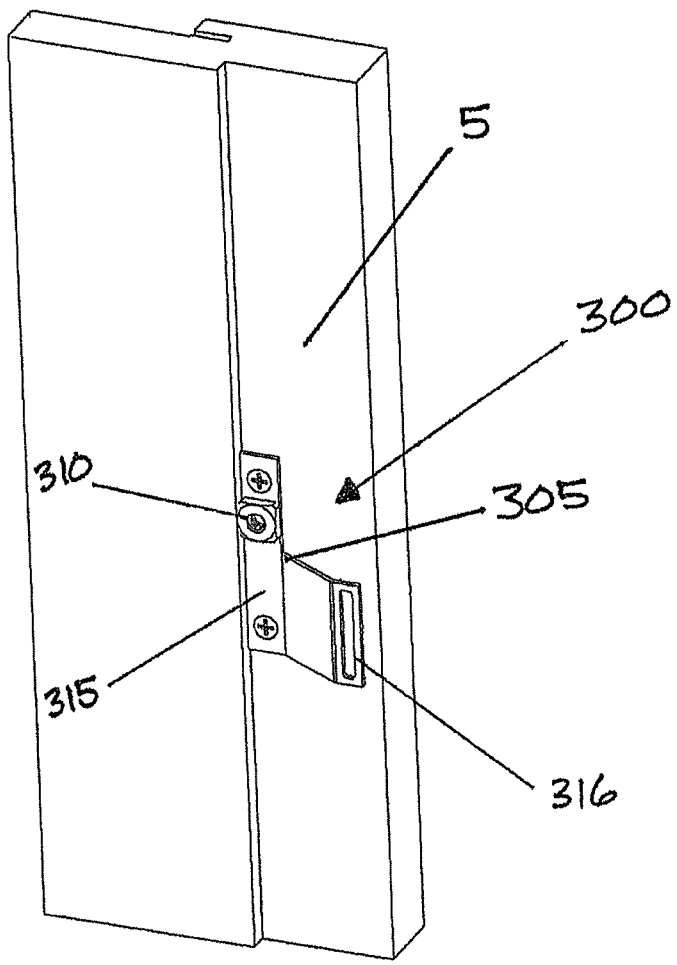
FIG. 15 shows a perspective view of a portion of a jamb assembly with a jamb bracket positioned thereon according to an exemplary embodiment of an installation device for aligning and securing a jamb assembly.

FIG. 14 shows a perspective view of a portion of a jamb assembly 5, with a clearance hole 11 extending therethrough. FIG. 15 shows a similar portion of a jamb assembly 5 from another viewpoint, with a jamb bracket 305 according to an exemplary installation device 300. The jamb bracket 305 comprises a threaded guide 310, a jamb contact member 315 (here secured to the jamb by fasteners) and a mating element 316. Here the guide 310 is shown integral to the jamb bracket 305 on a portion of the jamb contact member 315. The mating element 316 is shown extending from the jamb contact member 315.

Figure 16:
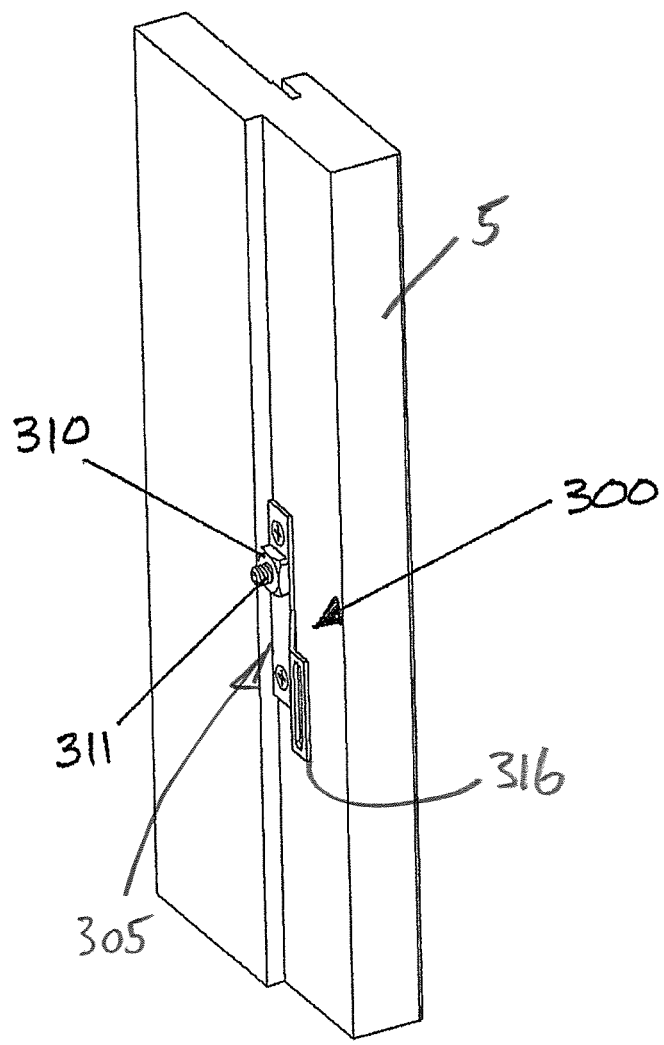
FIG. 16 shows another perspective view of the embodiment shown in FIG. 15 according to an exemplary embodiment of an installation device for aligning and securing a jamb assembly.

FIG. 16 shows another view of the installation device 300 shown in FIG. 15 further including a spacer 311 extending through the threaded guide 310. In certain embodiments, the spacer 311 is an open-ended hollow cylinder with a threaded outer surface or diameter and an inner surface or diameter adapted to allow a portion of a fastener such as a woodscrew to pass through, but not the entire length of the fastener, e.g., an end of the spacer may be adapted to prevent an entire length of the fastener from extending through the inner diameter of the spacer. When the spacer 311 has a threaded outer diameter, the spacer threadably engages with the inner surface or diameter of the threaded guide when extended therethrough.

Figure 17:
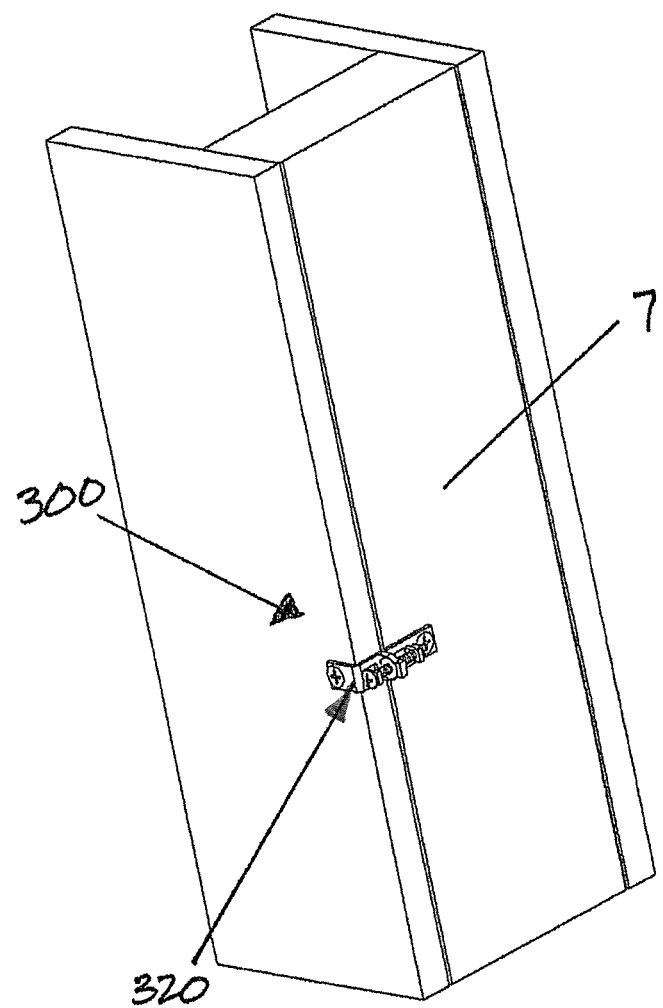
FIG. 17 shows a perspective view of a portion of a rough opening with a frame bracket positioned thereon according to an exemplary embodiment of an installation device for aligning and securing a jamb assembly.
Figure 18:
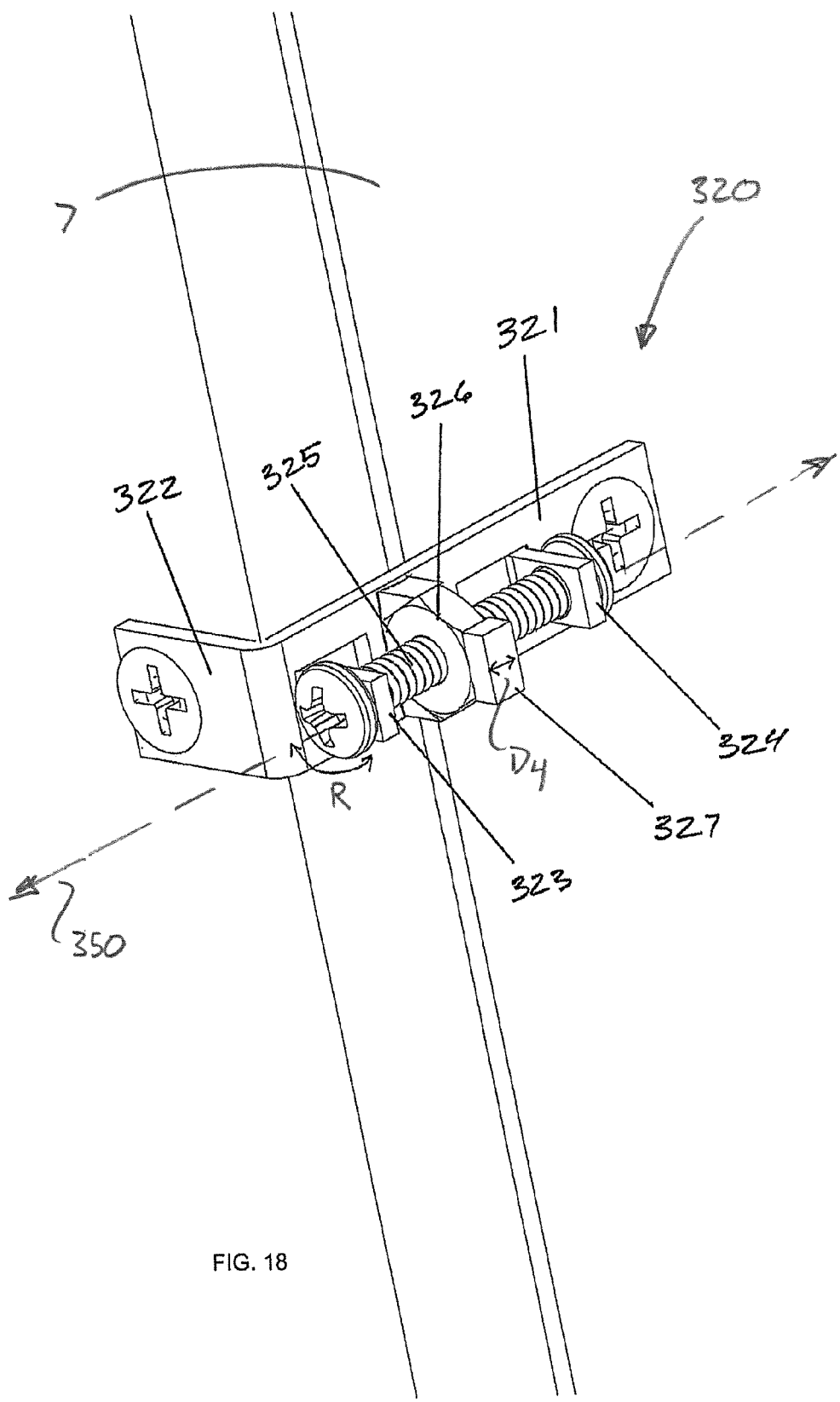
FIG. 18 shows a close-up perspective view of the frame bracket shown in FIG. 17 according to an exemplary embodiment of an installation device for aligning and securing a jamb assembly.

FIG. 17 shows a frame bracket 320 of the device 300 for aligning and securing the jamb assembly 5 shown in FIGS. 14-16. As shown, the frame bracket 320 engages a framing member 7 of a rough opening. FIG. 18 is a closer view of the frame bracket 320 shown in FIG. 17. The frame bracket 320 comprises a base member 321 (shown here in contact with a framing member of the rough opening), an optional frame alignment flange 322 extending away from the base member and engaging a surface of a panel (shown here extending from the base member at substantially a right angle), a first threaded member retainer 323, and a second threaded member retainer 324. In certain embodiments, such as that shown in FIG. 18, the threaded member retainers 323 and 324 extend from the base member 321 at substantially right angles. The distance or axis between the first threaded member retainer 323 and the second threaded member retainer 324 defines a traversing member path 350. As shown in FIG. 18, the longitudinal axes of the openings in the first threaded member retainer 323 and the second threaded member retainer form the traversing member path 350. The frame bracket 320 further includes a threaded member 325 extending between and retained by the first and second threaded member retainers 323 and 324. The threaded member 325 comprises a threaded outer surface or diameter along the traversing member path 350. As the arrow R indicates, the threaded member 325 may rotate within the first and second threaded member retainers 323 and 324.

The frame bracket 320 also comprises a traversing member 326. In certain embodiments, the traversing member 326 has a threaded inner surface or diameter. In such embodiments, the traversing member 326 is threadably engaged with the threaded member 325, such that rotation of the threaded member causes the traversing member 326 to traverse along the traversing member path 350 in the direction $D_4$. The traversing member 326 further comprises a mating tab 327 extending from an outer surface of the traversing member, the mating tab adapted to operationally engage with the mating element 316 of the jamb bracket 305.

Figure 19:
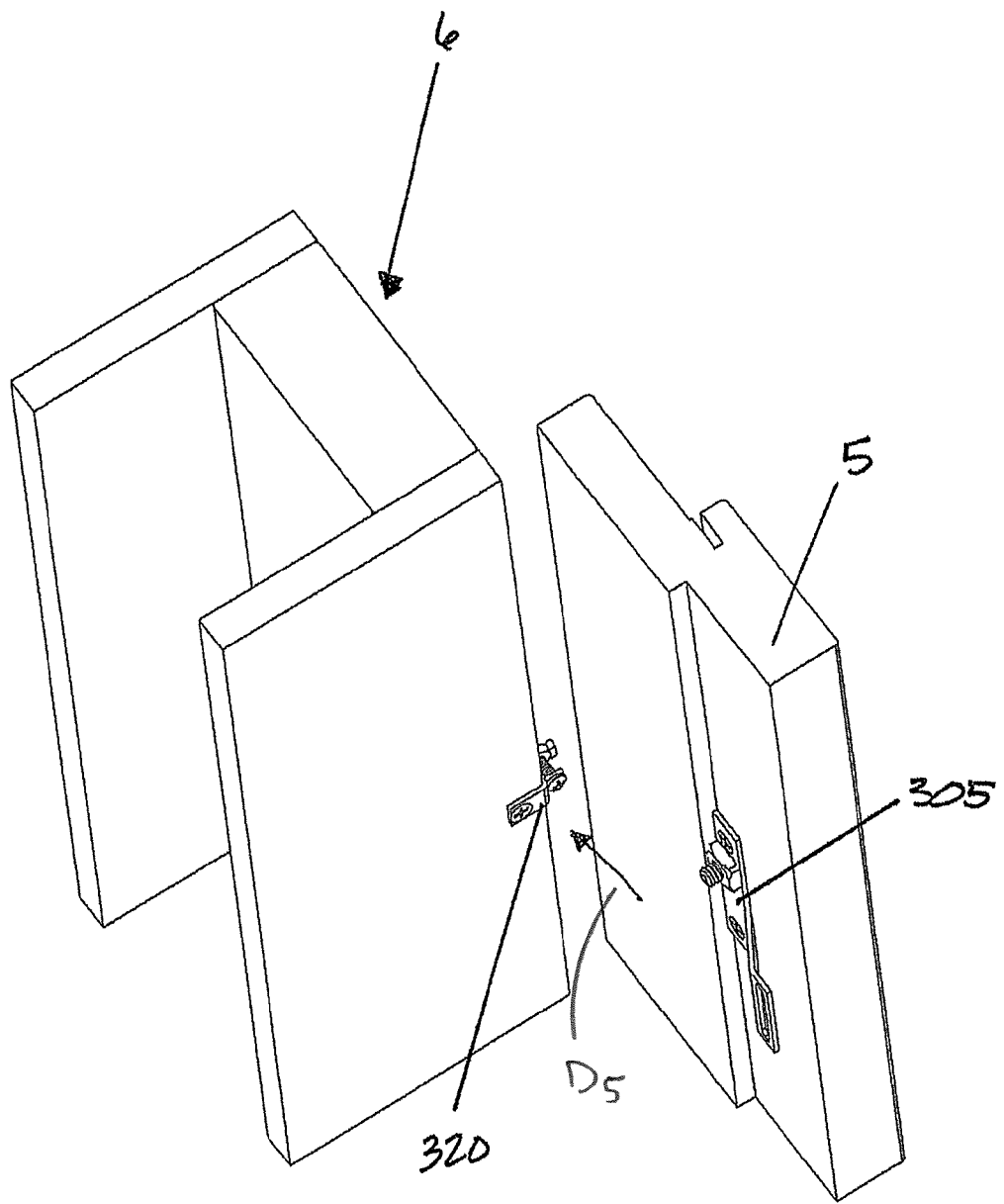
FIG. 19 shows a perspective view of a portion of a jamb assembly with a jamb bracket being positioned in proximity to a portion of a rough opening with a frame bracket according to an exemplary embodiment of an installation device for aligning and securing a jamb assembly.
Figure 20:
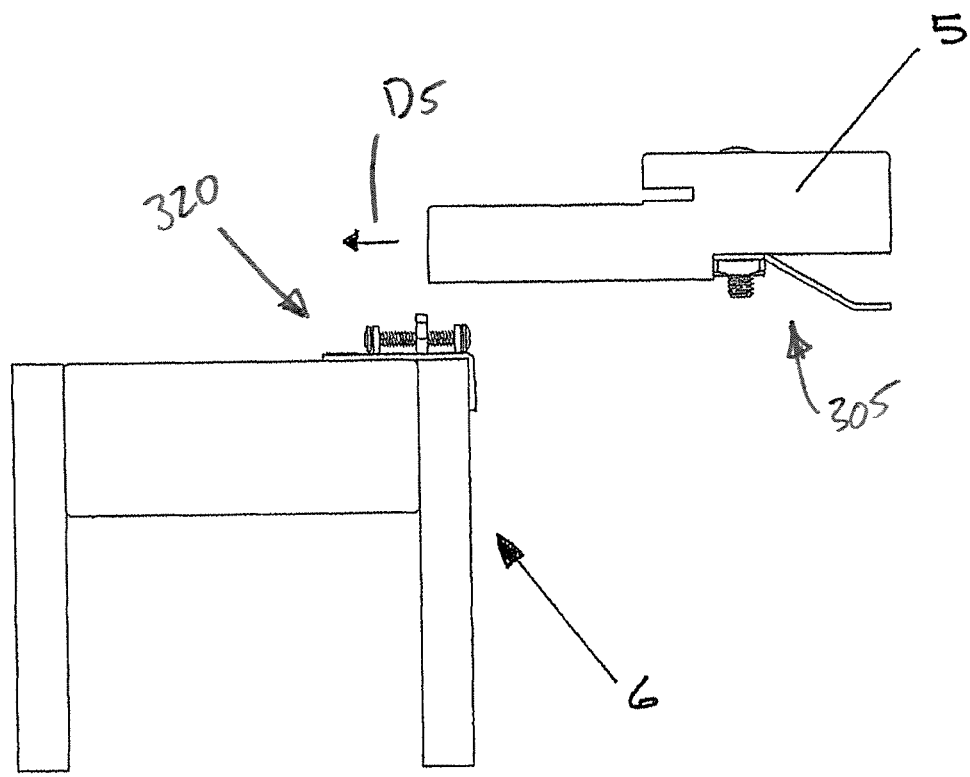
FIG. 20 shows a top view of the installation device shown in FIG. 19.
Figure 21:
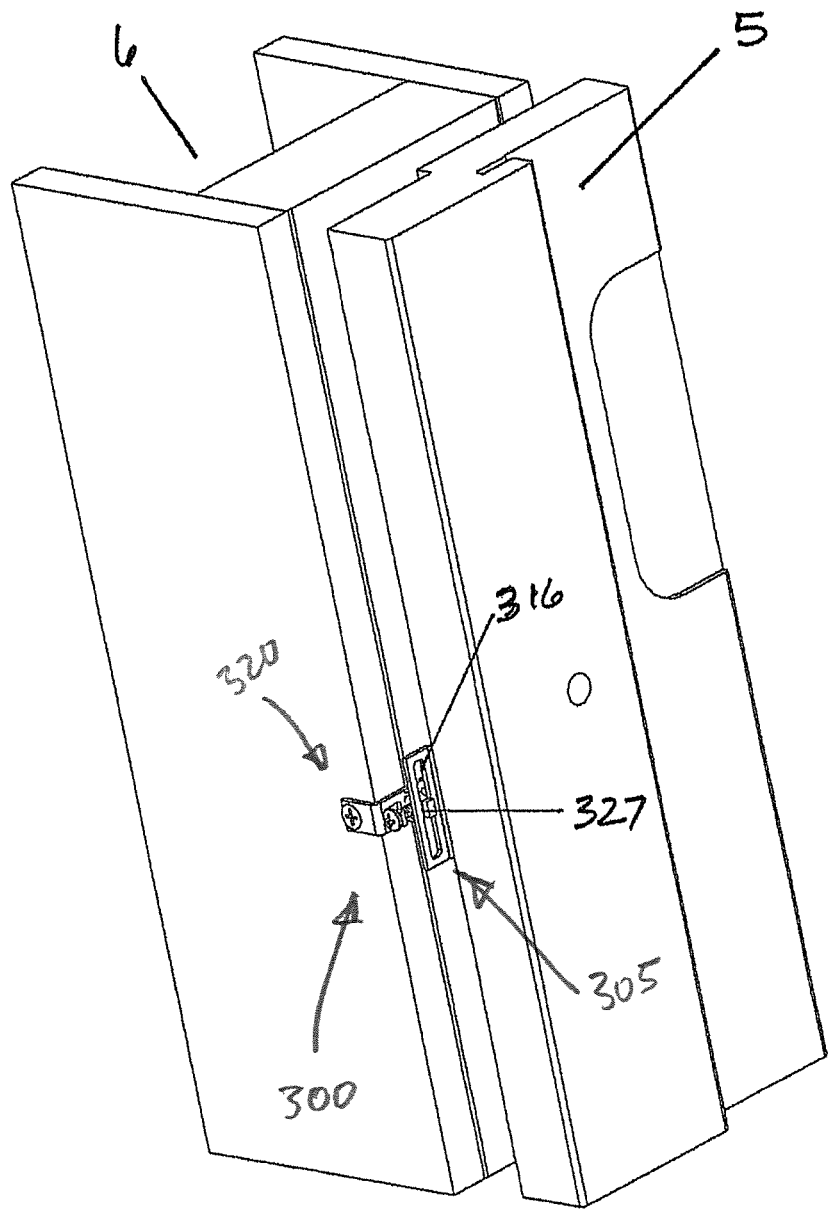
FIG. 21 shows a perspective view of an exemplary installation device for aligning and securing a jamb assembly wherein the frame bracket and the jamb bracket are operationally engaged via a mating tab and a mating element.

FIG. 19 shows a section of a jamb assembly 5 during positioning within a rough opening 6. The arrow $D_5$ indicates the general direction of positioning, bringing the jamb bracket 305 and the frame bracket 320 of the device 300 into proximity with one another. FIG. 20 shows another view of the jamb assembly 5 being positioned within the rough opening 6. FIG. 21 shows the jamb assembly 5 positioned within the rough opening 6, allowing for the mating tab 327 of the frame bracket 320 and the mating element 316 of the jamb bracket 305 to operationally engage.

Figure 22:
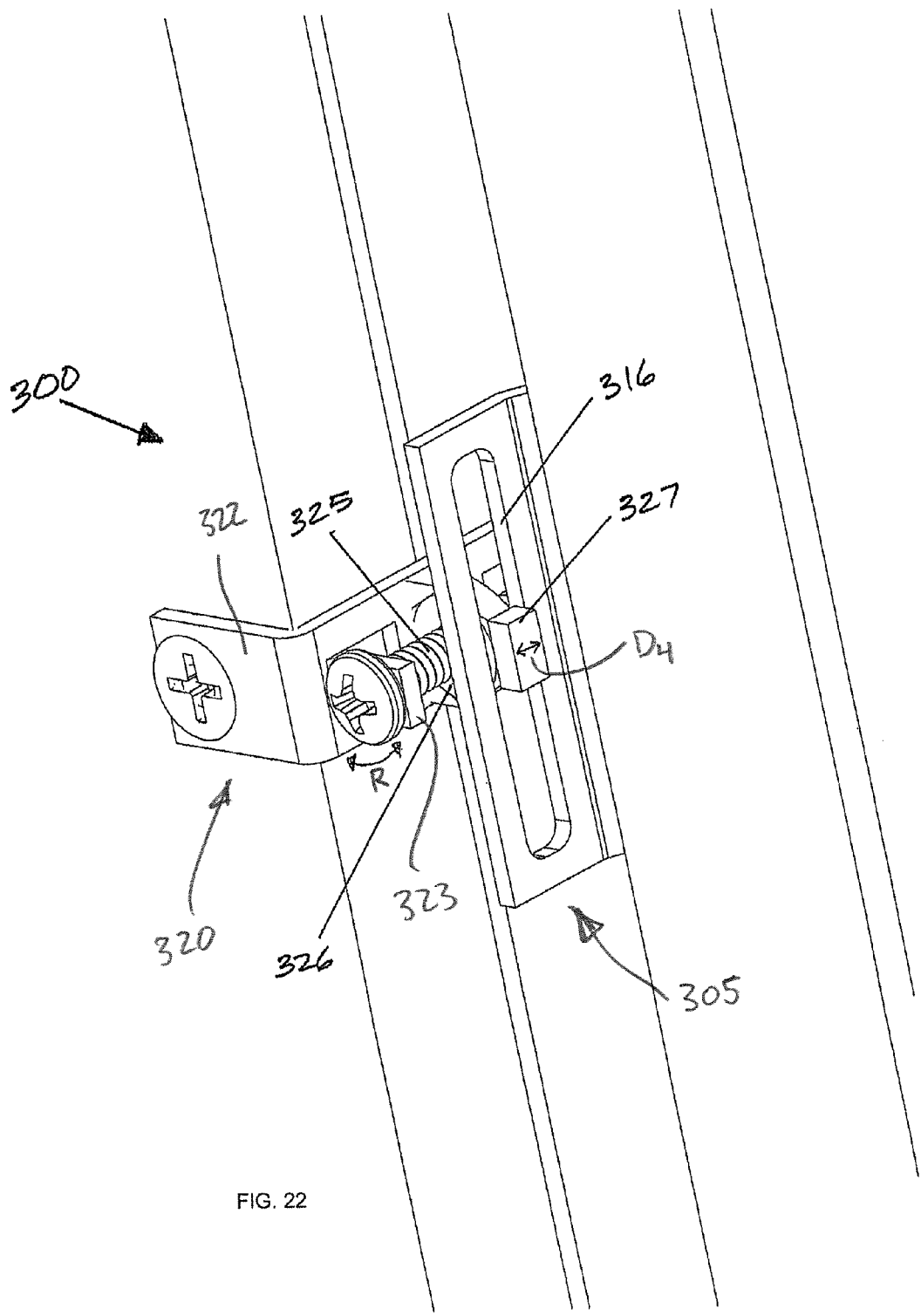
FIG. 22 shows a close-up perspective view of the embodiment shown in FIG. 21.

FIG. 22 is a closer view of the device 300 for aligning and securing a jamb assembly, wherein the mating tab 327 is operationally engaged with the mating element 316. As previously mentioned, rotation of the threaded member 325 causes the traversing member 326 to traverse along the traversing member path 350. Once the brackets 320 and 305 of the device 300 are operationally engaged, as shown in FIG. 22, the rotation of the threaded member 325 causes not only the traversing member 326 to move, but also the jamb bracket, and correspondingly the jamb assembly 5 relative to the rough opening 6. Thereby, a user can adjust the position of the jamb assembly 5 by rotation of the threaded member 325 once operationally engaged with the mating element 316 of the jamb bracket 305. Thus, if a user utilizes a device 300 at each of the corners of a rough opening 6, a jamb assembly 5 can be adjusted into planar alignment with the rough opening by adjustment of each threaded member 325.

Figure 23:
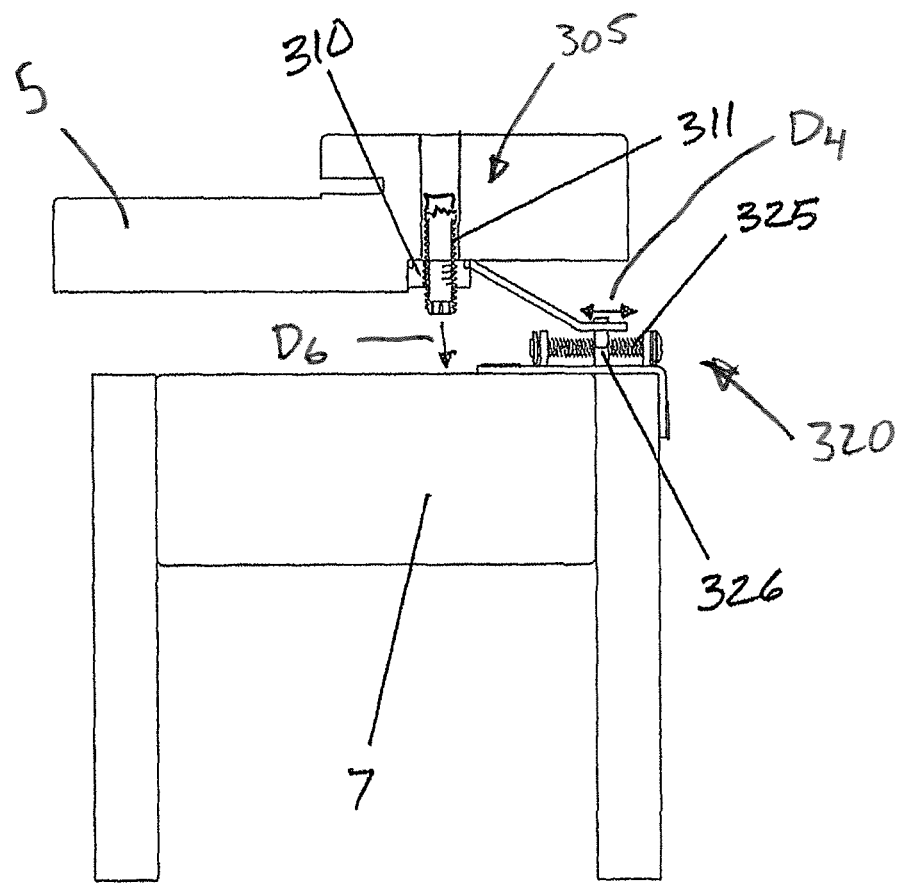
FIG. 23 shows a cross-sectional view of an exemplary installation device for aligning and securing a jamb assembly wherein a frame bracket and a jamb bracket are operationally engaged via a mating tab and a mating element and a spacer is extended through a threaded guide.

FIG. 23 shows another view of the device 300 for aligning and securing a jamb assembly, wherein the two brackets 305 and 320 are operationally engaged and the threaded guide 310 and the spacer 311 are shown. The arrow $D_6$ indicates the direction of movement of the spacer 311 through the threaded guide 310 and into contact with the framing member 7. The other arrow $D_4$ indicates the direction of movement of the traversing member 326 along the length of the threaded member 325 caused by the rotation of the threaded member. These adjustments may be made iteratively until the jamb assembly 5 is satisfactorily positioned relative to the rough opening 6.

Figure 24:
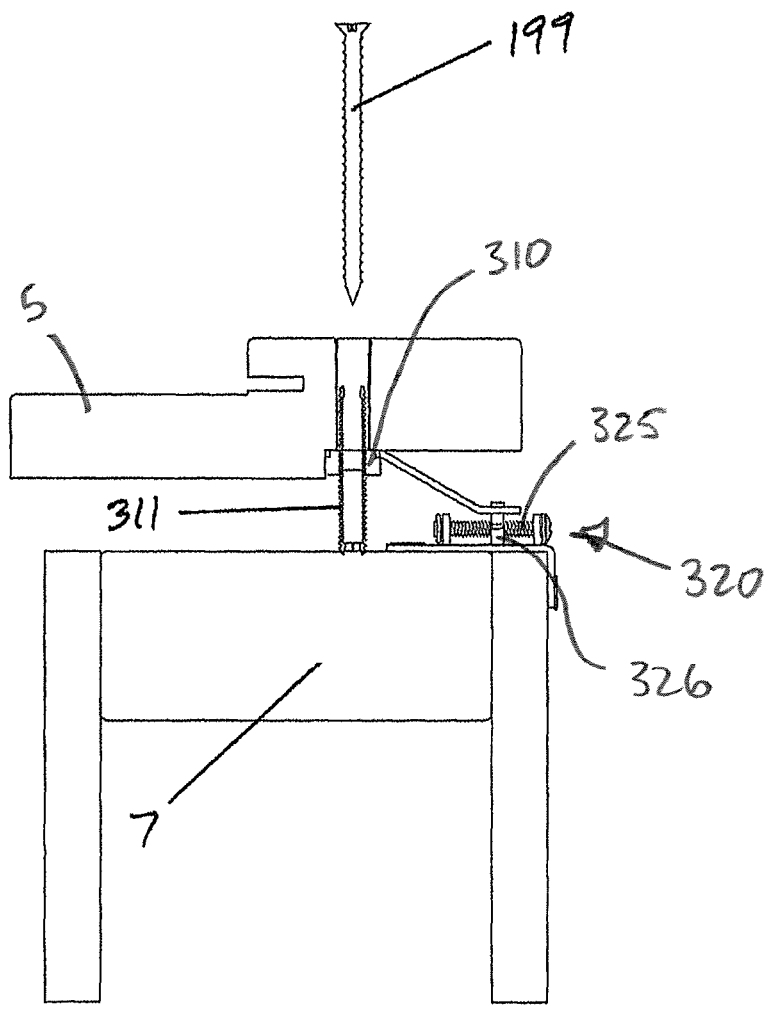
FIG. 24 shows a cross-sectional view of the embodiment shown in FIG. 23, wherein the spacer is extended through the guide and into contact with a framing member and a fastener is positioned to secure the jamb assembly to the framing member.
Figure 25:
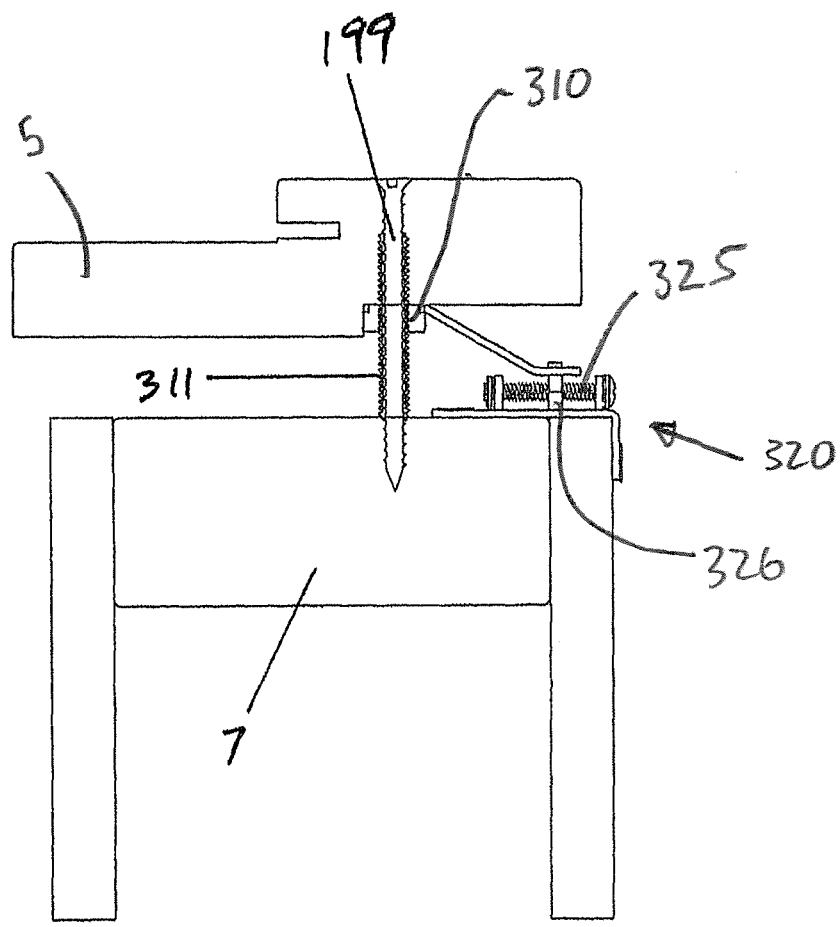
FIG. 25 shows a cross-sectional view of the embodiment shown in FIG. 24, wherein the fastener is extended through the spacer and into the framing member.

FIG. 24 shows the device 300 with the spacer 311 extended through the threaded guide 310 and into contact with the framing member 7. Once satisfactorily aligned, the jamb assembly 5 may be secured to the framing member 7 by a fastener 199. FIG. 25 shows another view wherein the fastener 199 has been extended through the spacer 311 and into the framing member 7 to secure the jamb assembly 5 in alignment with the rough opening 6. As can be seen from the drawings, in certain embodiments, an end of the spacer 311 is adapted to prevent an entire length of the fastener 199 from extending through the inner diameter of the spacer.

Figure 26:
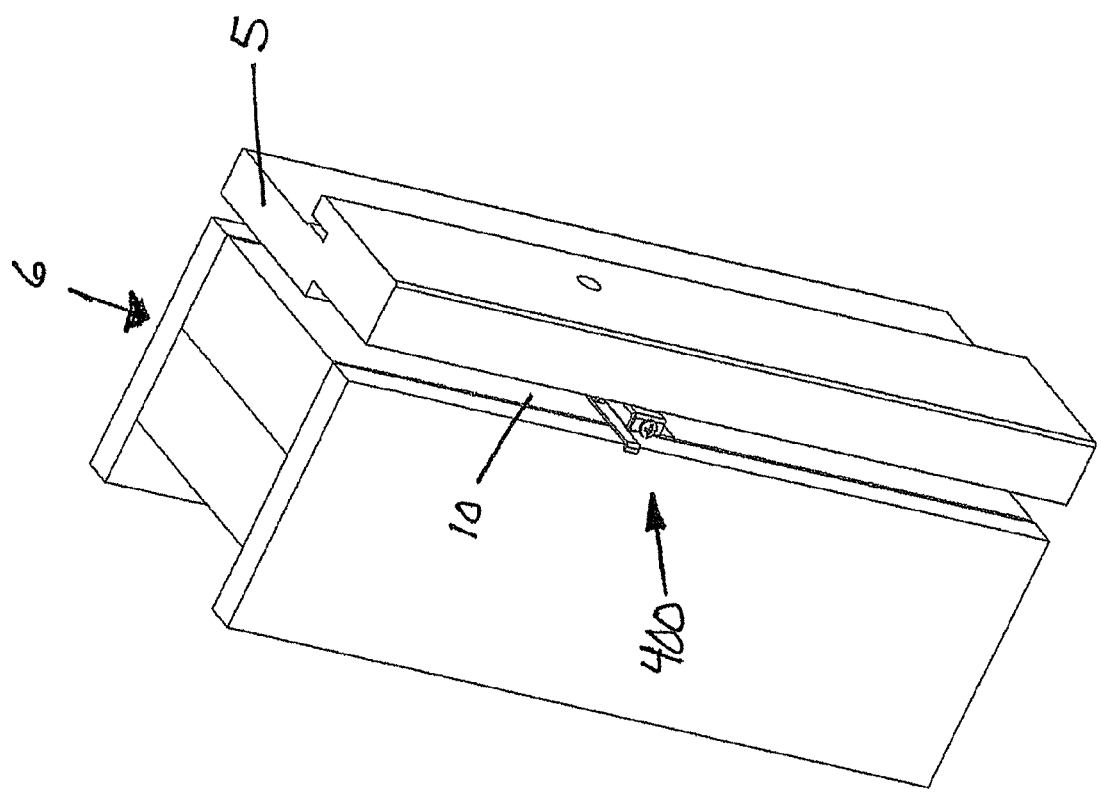
FIG. 26 shows a perspective view of a portion of a jamb assembly with a jamb bracket positioned in proximity to a portion of a rough opening with a frame bracket according to an exemplary embodiment of an installation device for aligning and securing a jamb assembly.
Figure 27:
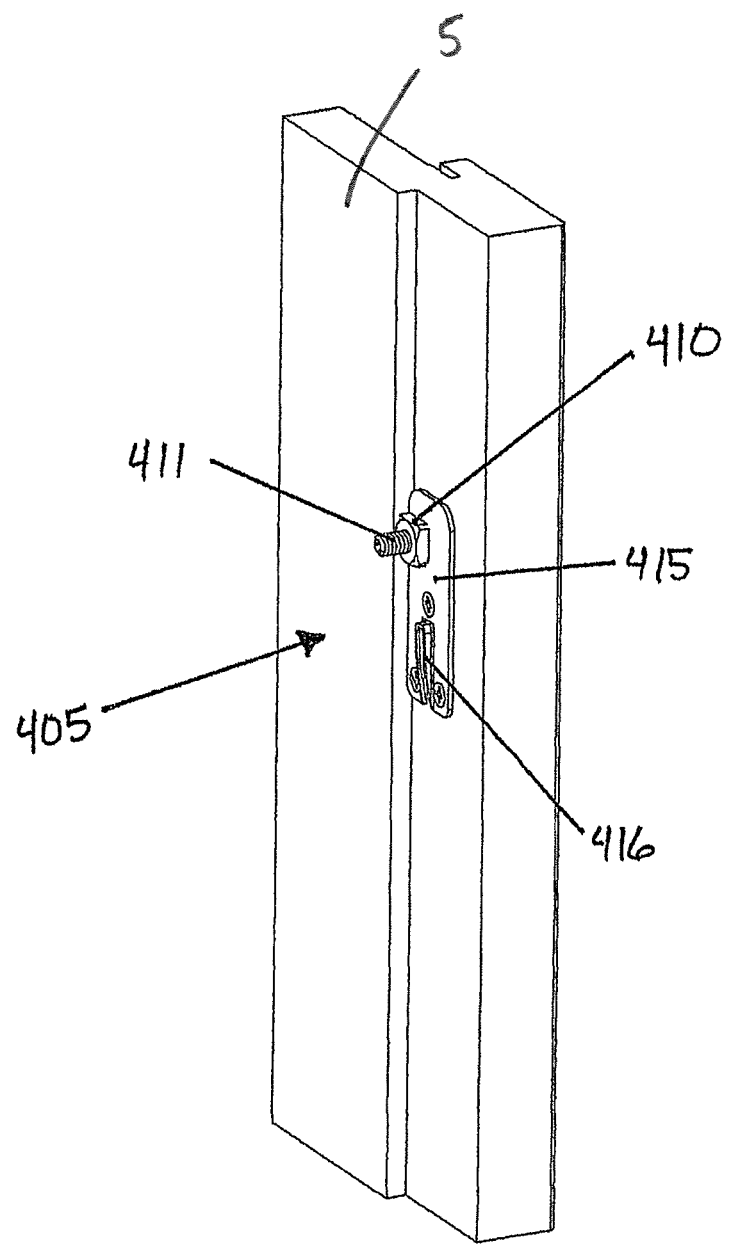
FIG. 27 shows a perspective view of a portion of a jamb assembly with a jamb bracket positioned thereon according to an exemplary embodiment.

FIG. 26 illustrates an installation device 400 for aligning and securing a jamb assembly. As shown, the installation device 400 is positioned in the gap 10 between a rough opening 6 and a jamb assembly 5. FIG. 27 shows a portion of a jamb assembly 5 with a jamb bracket 405 of the device 400 attached thereto. The jamb bracket 405 comprises a threaded guide 410 with a spacer 411 extending therethrough, a jamb contact member 415 (here secured to the jamb by fasteners) and a mating element 416. Here the threaded guide 410 is shown integral to the jamb bracket 405 and on a portion of the jamb contact member 415.

Figure 28:
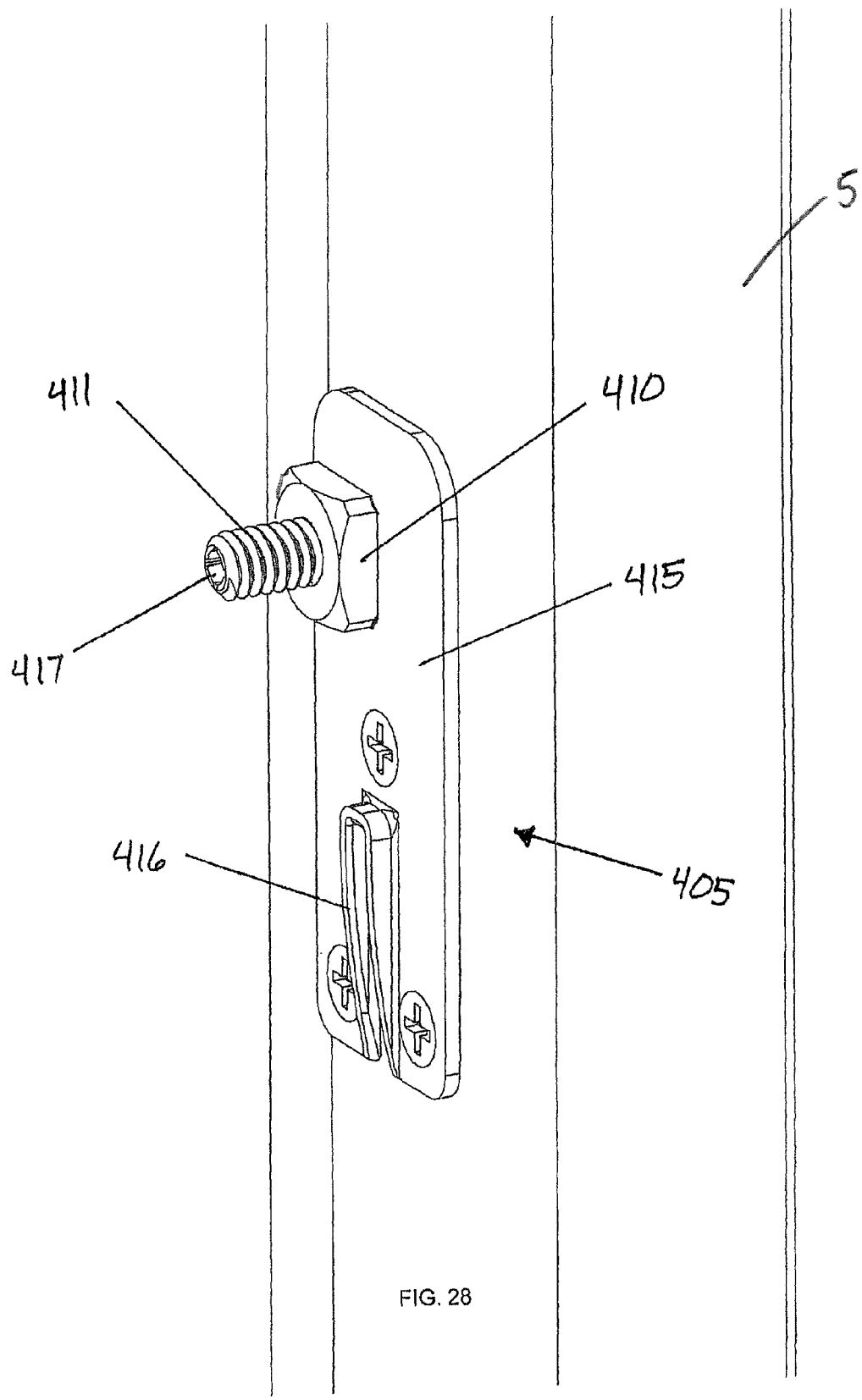
FIG. 28 shows a close-up perspective view of the jamb bracket shown in FIG. 27.

FIG. 28 is a close-up view of the jamb bracket 405 shown in FIG. 27. The jamb bracket 405 comprises a jamb contact member 415, a mating element 416, and a threaded guide 410 with a spacer 411 extending at least partially therethrough. As shown, the spacer 411 comprises a hollow portion 417 and the mating element 416 comprises a channel with parallel walls extending outward from the jamb contact member 415.

Figure 29:
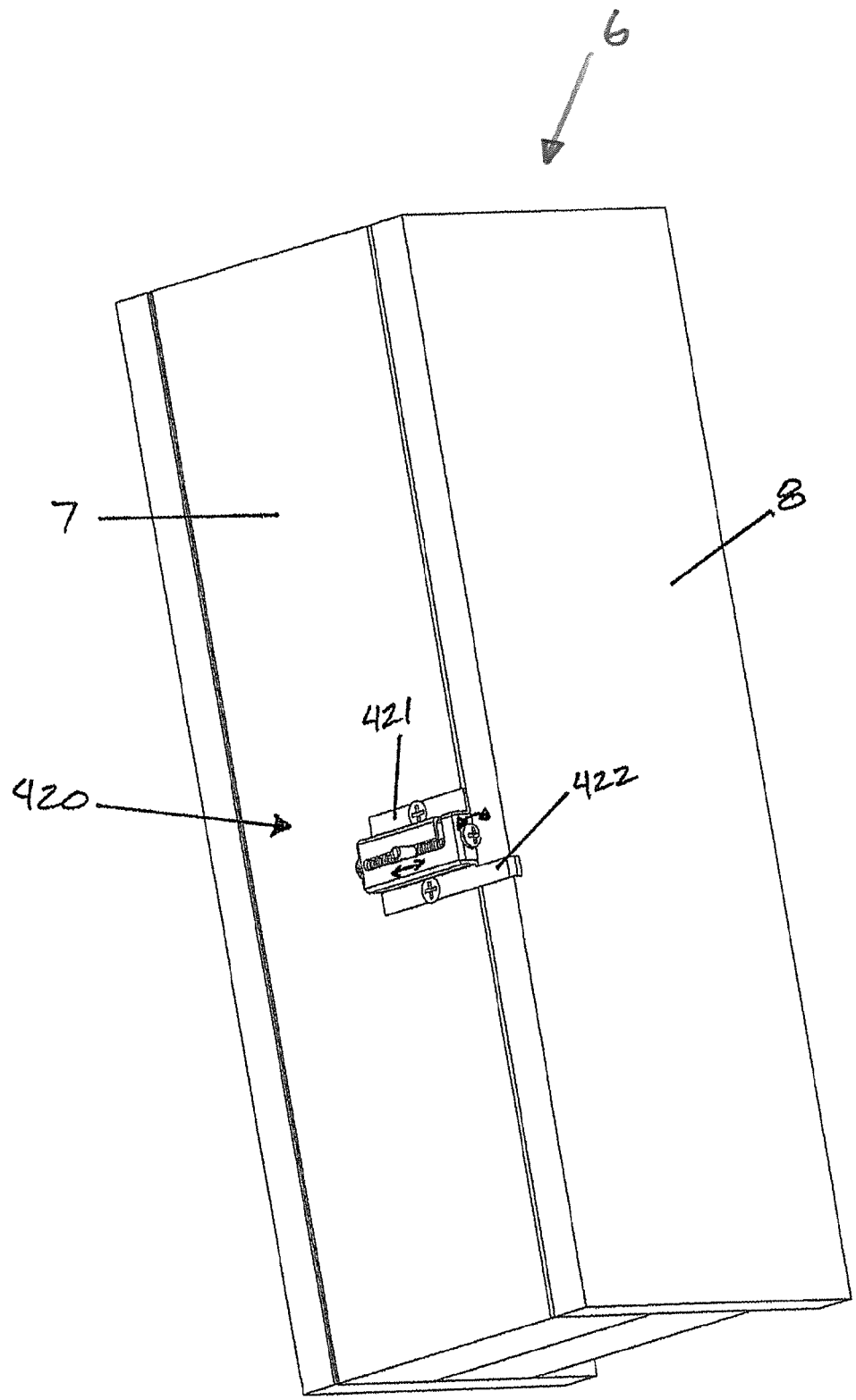
FIG. 29 shows a perspective view of a portion of a rough opening with a frame bracket positioned thereon according to an exemplary embodiment.
Figure 30:
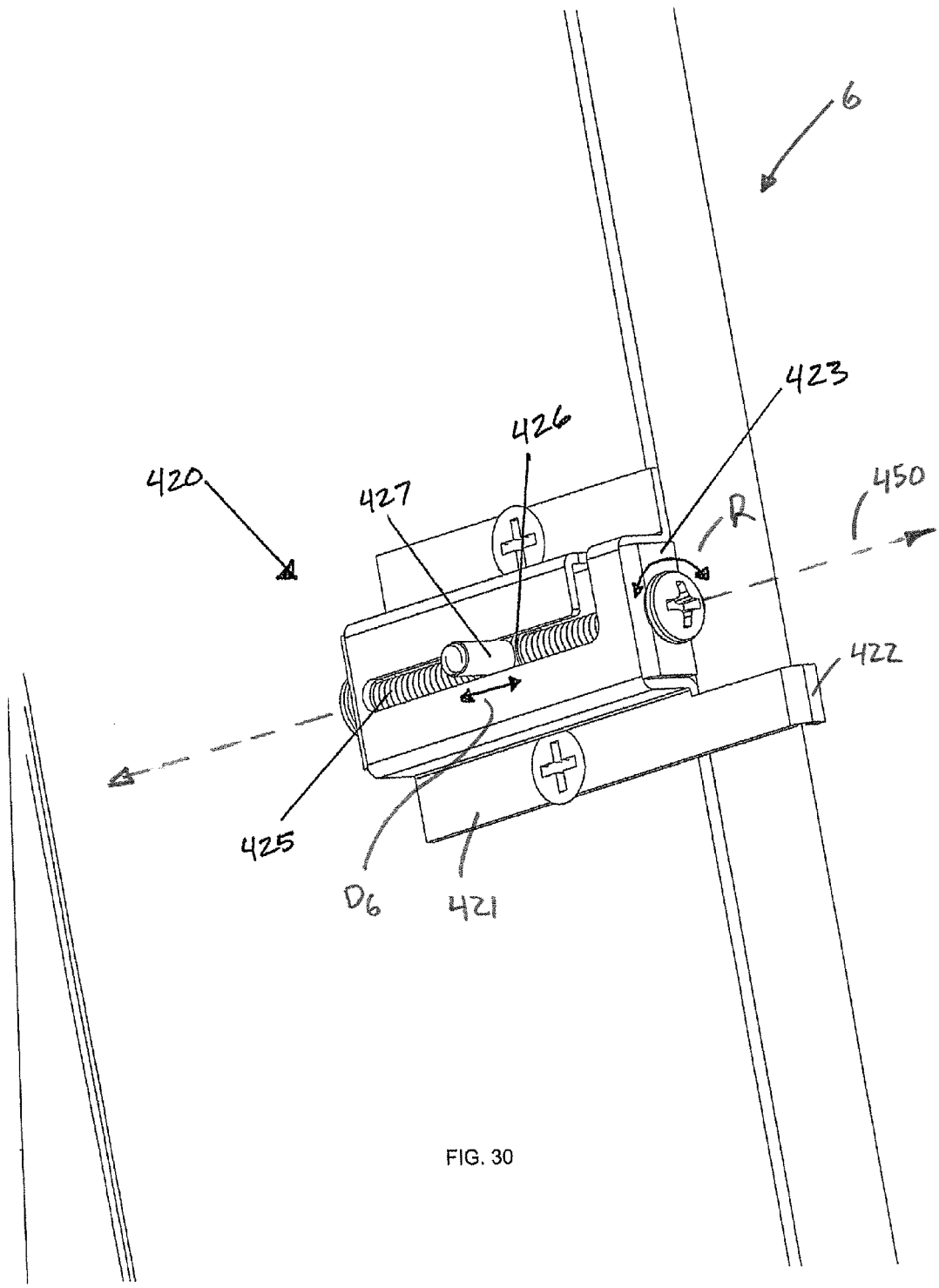
FIG. 30 shows a close-up perspective view of the frame bracket shown in FIG. 29.
Figure 32:
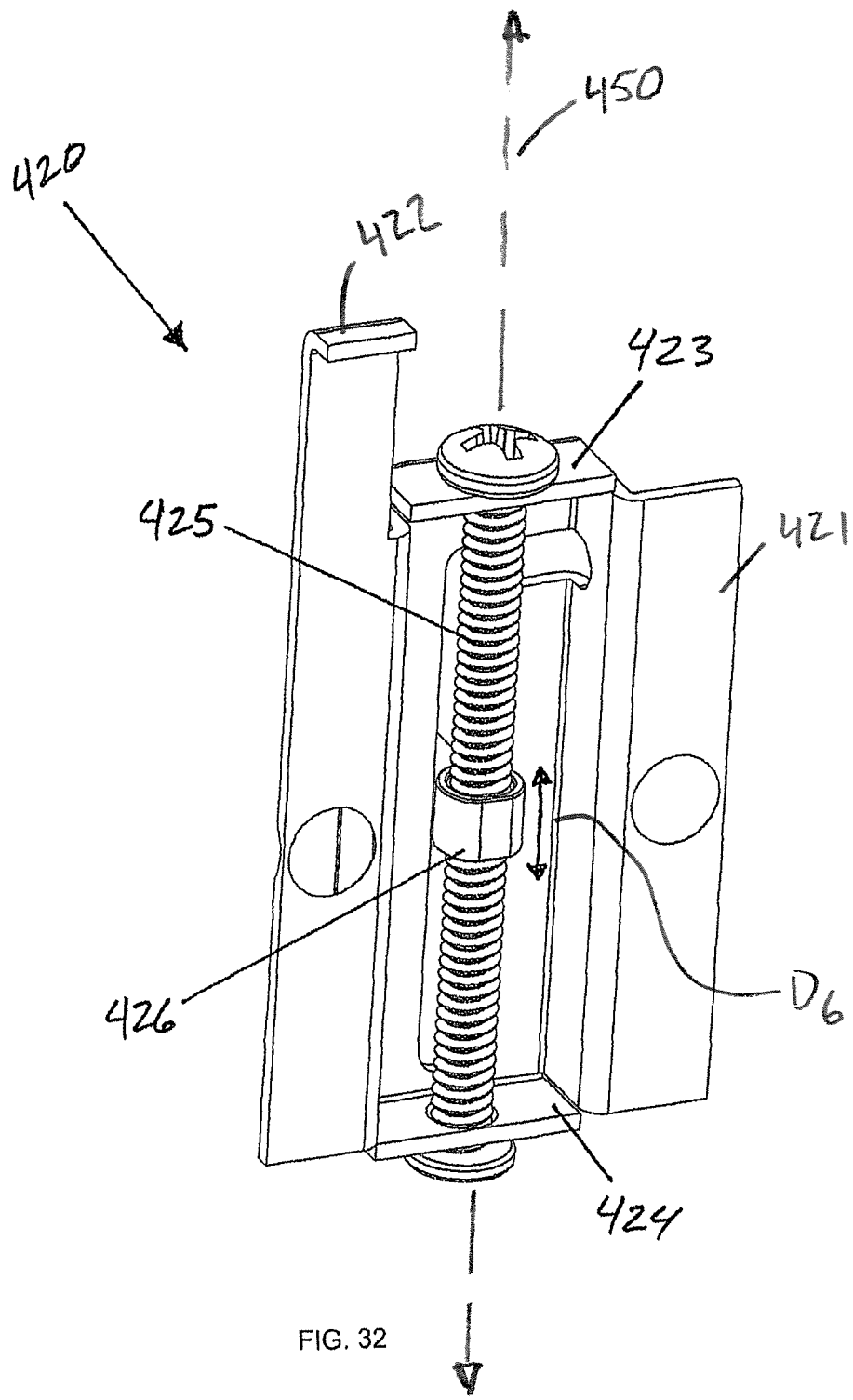
FIG. 32 shows a perspective view of the frame bracket shown in FIG. 31 showing the traversing member and traversing member path.

FIG. 29 shows a frame bracket 420 of the installation device 400, the frame bracket engaging a framing member 7 of a rough opening 6. The frame bracket 420 comprises a base member 421 (shown here in contact with a framing member 7 of the rough opening 6) and an optional frame alignment flange 422 extending away from the base member and engaging a surface of a panel 8 (shown here extending from the base member at substantially a right angle). FIG. 30 is a close-up view of a frame bracket 420 shown in FIG. 29. The frame bracket 420 comprises a first threaded member retainer 423 extending from the base member and a second threaded member retainer 424 (FIG. 32) opposite the first threaded member retainer. In certain embodiments, such as that shown in FIG. 30, the first and second threaded member retainers 423 and 424 extend from base member 421 at substantially right angles. The distance or axis between the first threaded member retainer 423 and the second threaded member retainer 424 define a traversing member path 450. As shown in FIG. 32, the longitudinal axes of the openings in the first threaded member retainer 423 and the second threaded member retainer 424 form the traversing member path 450. The frame bracket further includes a threaded member 425 extending between and retained by the first and second threaded member retainers 423 and 424. The threaded member comprising a threaded outer diameter along the traversing member path. The threaded member 425 comprises a threaded outer surface or diameter along the traversing member path 450. As the arrow R in FIG. 30 indicates, the threaded member 425 may rotate within the first and second threaded member retainers 423 and 424.

Further, the frame bracket 420 comprises a traversing member 426. In certain embodiments, the traversing member 426 has a threaded inner diameter or surface. In such embodiments, the traversing member 426 is threadably engaged with the threaded member 425 such that rotation of the threaded member causes the traversing member 426 to traverse along the traversing member path 450 as shown by the arrow $D_6$ in FIGS. 30 and 32. The traversing member 426 further comprises a mating tab 427 extending from an outer diameter or surface of the traversing member, the mating tab adapted to operationally engage with the mating element 416 of the jamb bracket 405.

Figure 31:
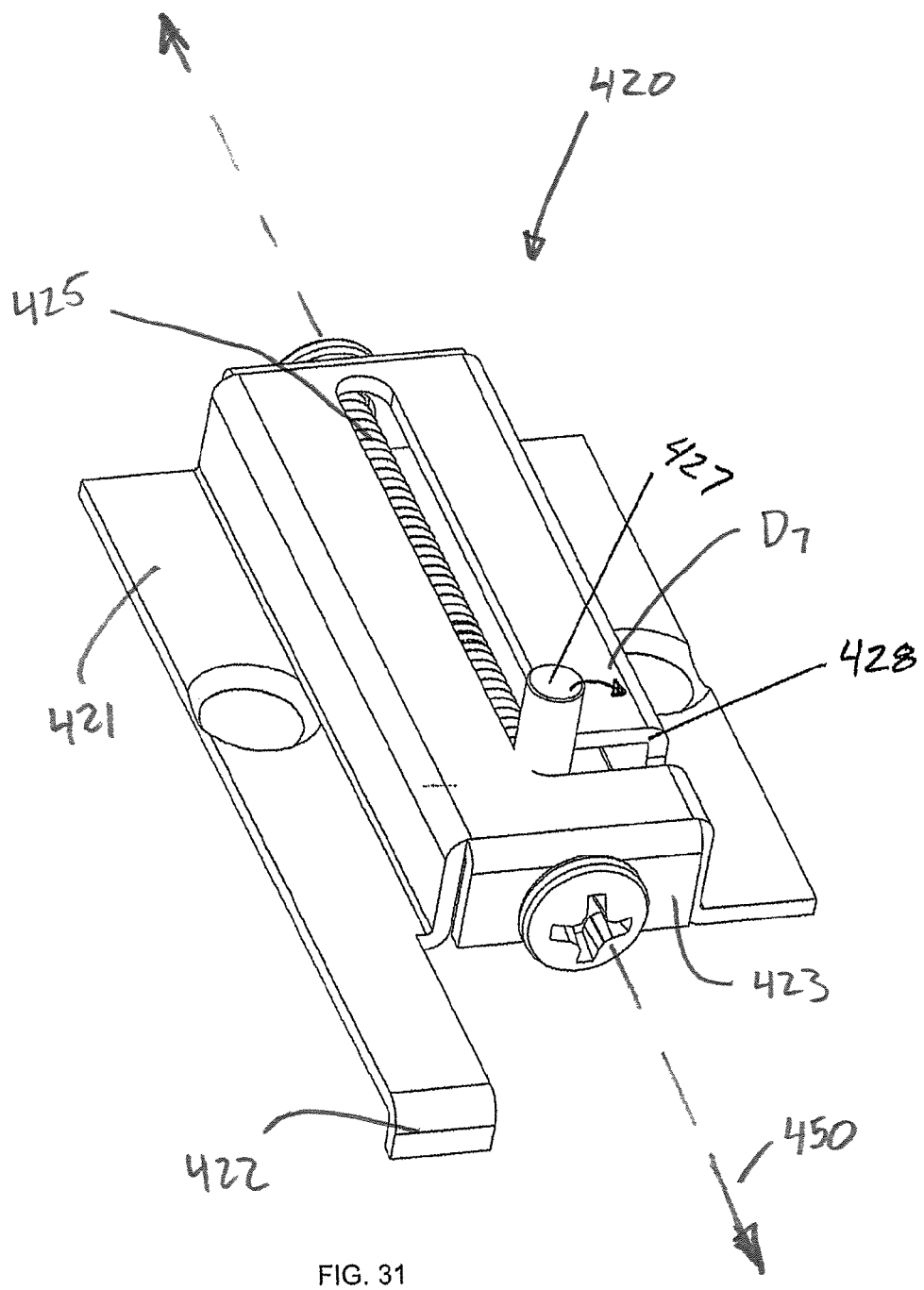
FIG. 31 shows a perspective view of a frame bracket according to an exemplary embodiment showing an optional mating tab retaining slot positioned in the base member.

FIG. 31 shows a perspective view of the frame bracket 420 of the installation device 400. In FIG. 31, the arrow $D_7$ indicates that the mating tab 427 may be selectively rotated into, or out of, an optional mating tab retaining slot 428 in the base member 421. This rotation may help to facilitate insertion of the mating tab 427 into the mating element 416 or slot.

FIG. 32 shows a rear view of the frame bracket 420 of the installation device 400. The frame bracket 420 comprises a threaded member retainer 423 and a second threaded member retainer 424. As shown, the threaded member 425 is disposed between the two threaded member retainers 423 and 424 with the traversing member 426 threadably engaged with the threaded member. The arrow $D_6$ indicates the direction of movement of the traversing member 426 along the traversing member path 450 as the threaded member is rotated between the two threaded member retainers 423 and 424.

Figure 33:
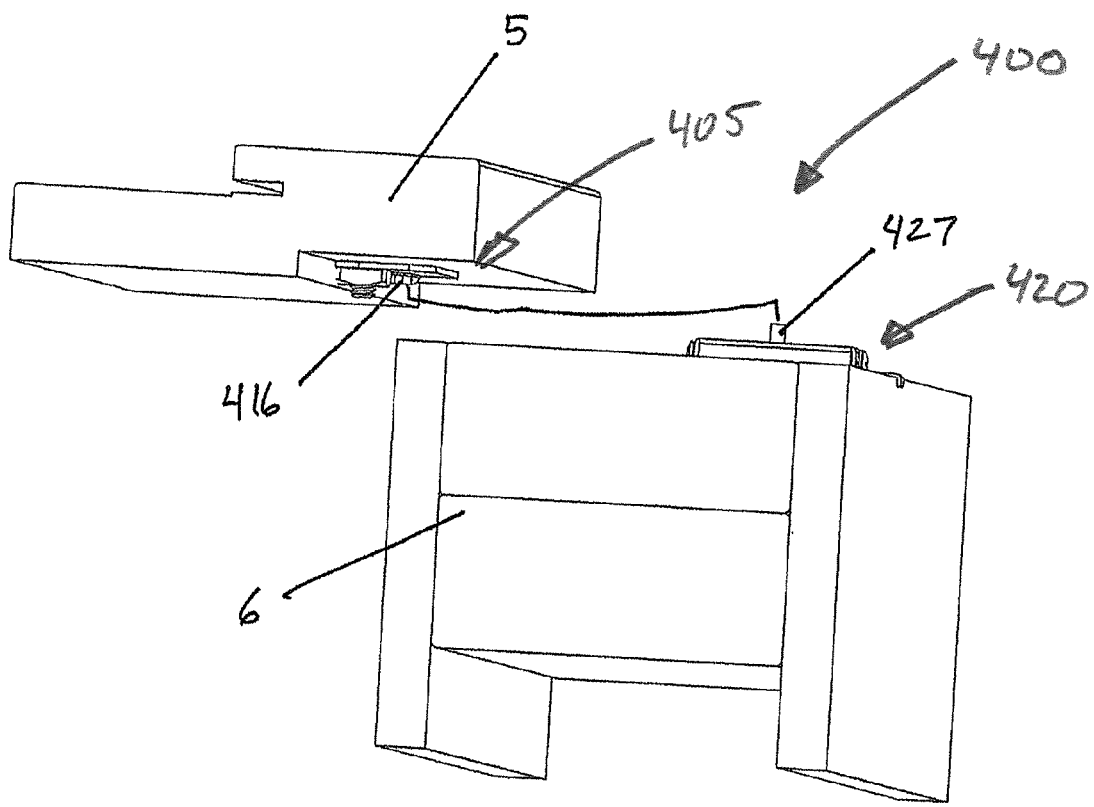
FIG. 33 shows a perspective view of a portion of a jamb assembly being positioned in proximity to a portion of a rough opening with brackets according to an exemplary installation device for aligning and securing a jamb assembly attached respectively thereto.
Figure 34:
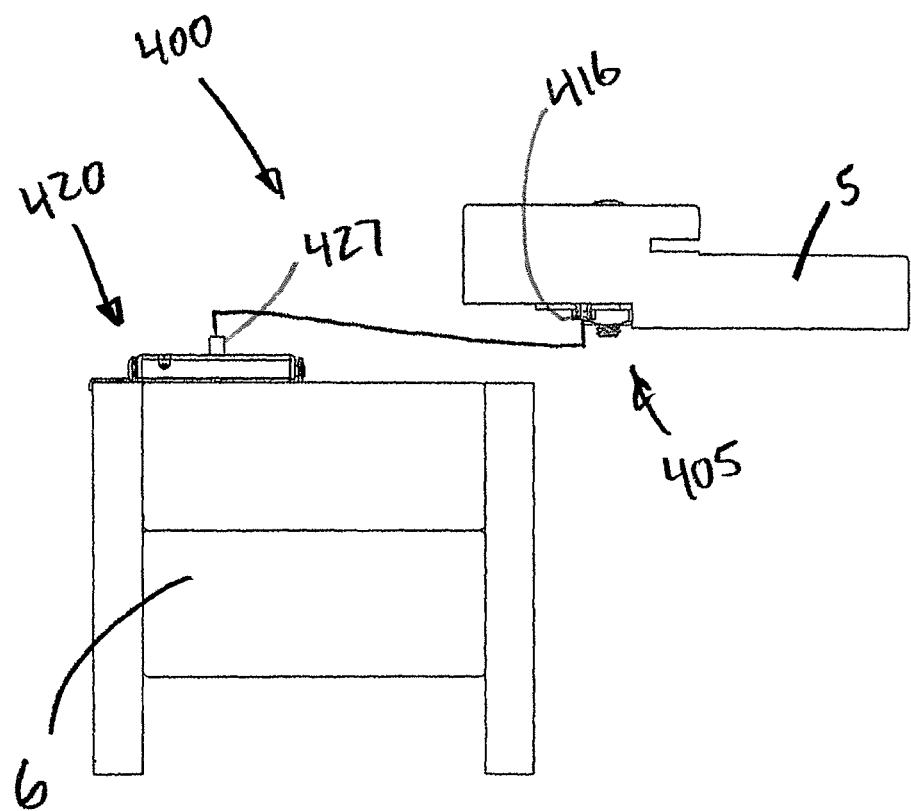
FIG. 34 shows a top view of the portion of the jamb assembly positioned in proximity to the portion of the rough opening shown in FIG. 33.
Figure 35:
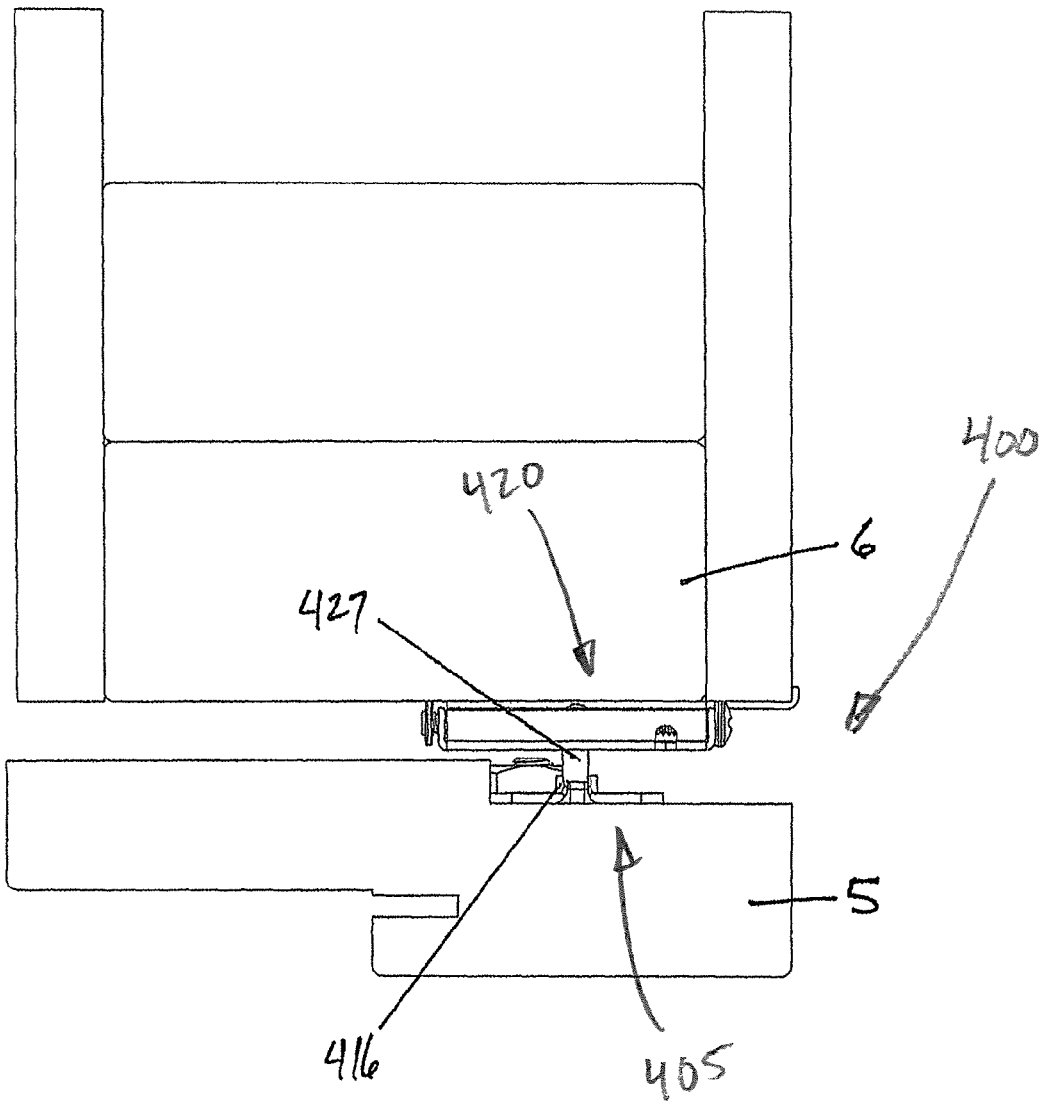
FIG. 35 shows a top view of an exemplary embodiment of an installation device for aligning and securing a jamb assembly in a rough opening, wherein a frame bracket and a jamb bracket of the installation device are operationally engaged via a mating tab and a mating element.

FIGS. 33 and 34 show the jamb assembly 5 in proximity to a rough opening 6, thereby bringing the mating element 416 of the jamb bracket 405 into operational engagement with the mating tab 427 of the frame bracket 420. FIG. 35 shows the jamb assembly 5 positioned into the rough opening 6 such that the mating tab 427 is operationally engaged (mated) with the mating element 416.

Figure 36:
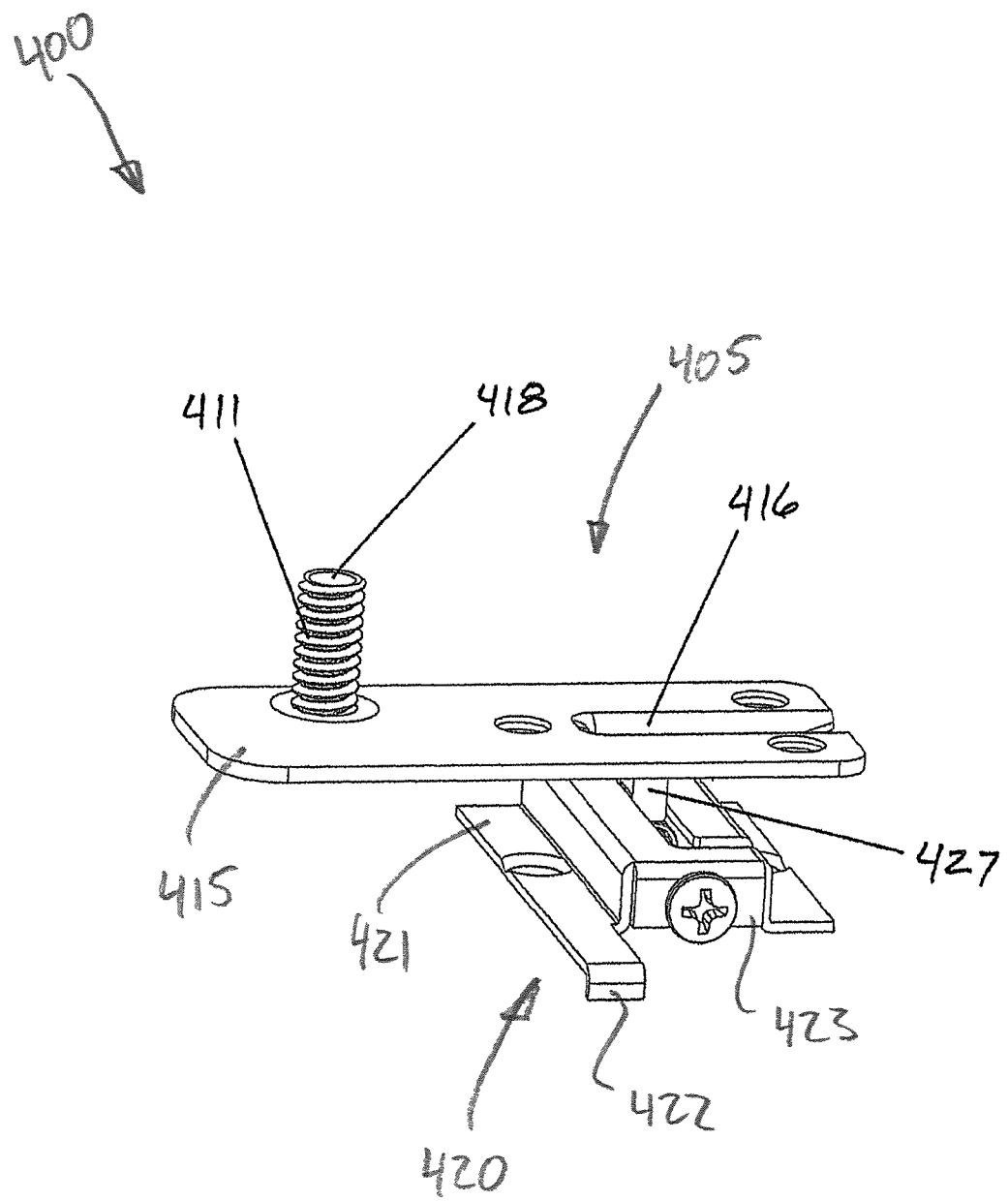
FIG. 36 shows a perspective view of the installation device shown in FIG. 35 with the jamb assembly and the rough opening removed for clarity.

FIG. 36 shows the installation device 400 wherein the jamb bracket 405 and the frame bracket 420 are positioned in operational engagement and the rough opening and jamb assembly removed for ease of viewing. As can be seen from the Figure, the mating tab 427 is operationally engaged with the mating element 416 and the spacer 411 is also shown extending into a threaded guide (not shown), the spacer comprising a hollow portion 417 for extension of a fastener therethrough.

Figure 37:
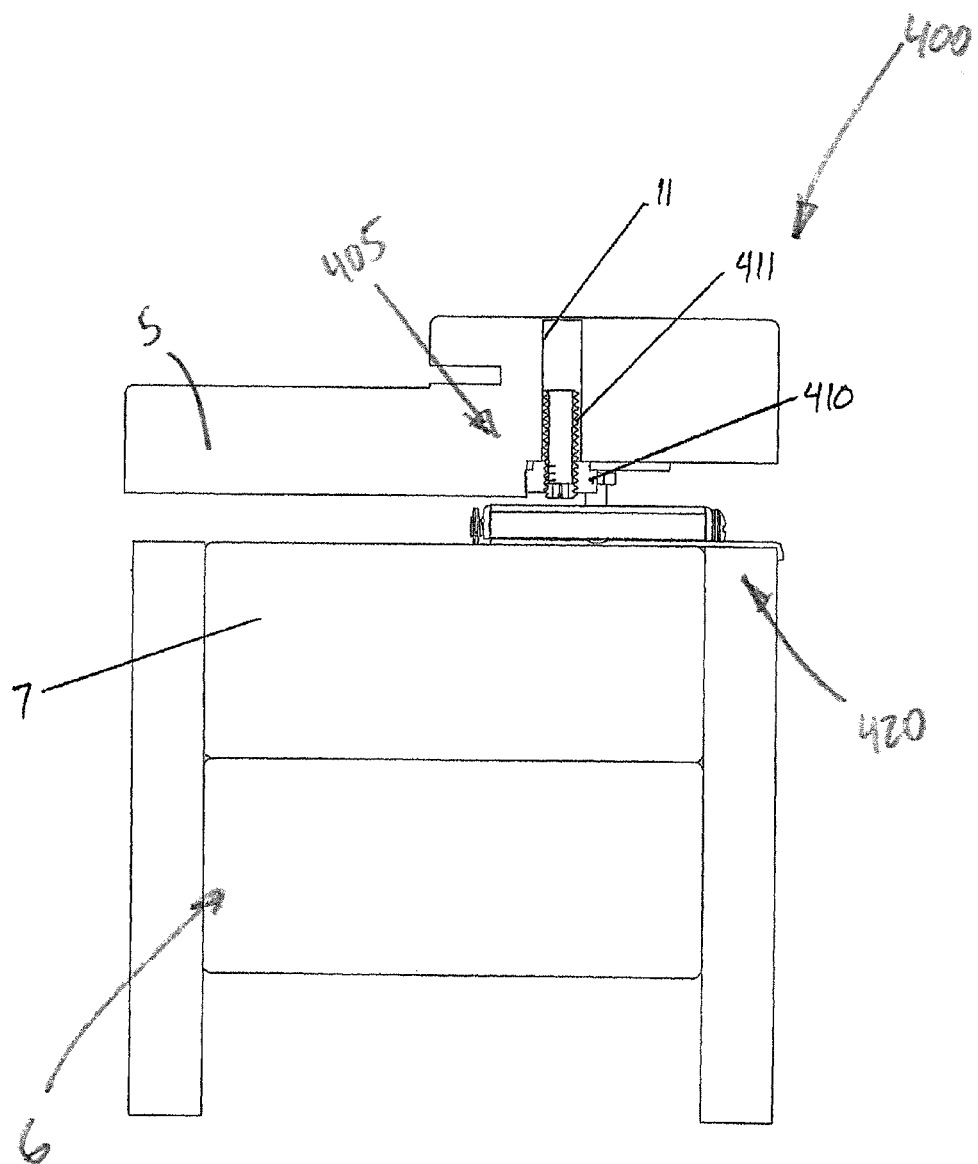
FIG. 37 shows a cross-sectional view of the installation device shown in FIG. 35 with a spacer extending through a threaded aperture.
Figure 38:
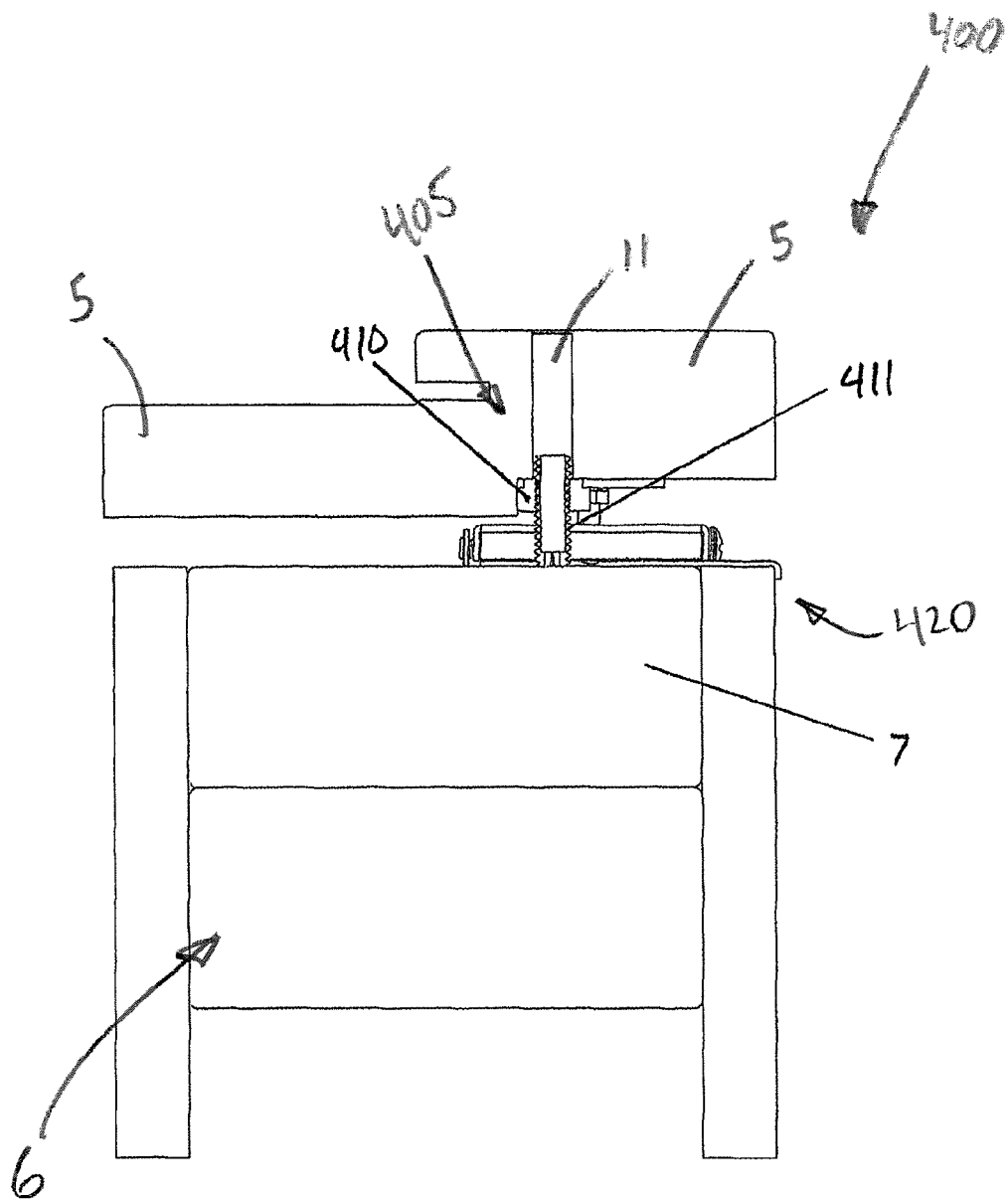
FIG. 38 shows a further view of the section shown in FIG. 37, wherein the spacer has been extended into contact with the framing member.
Figure 39:
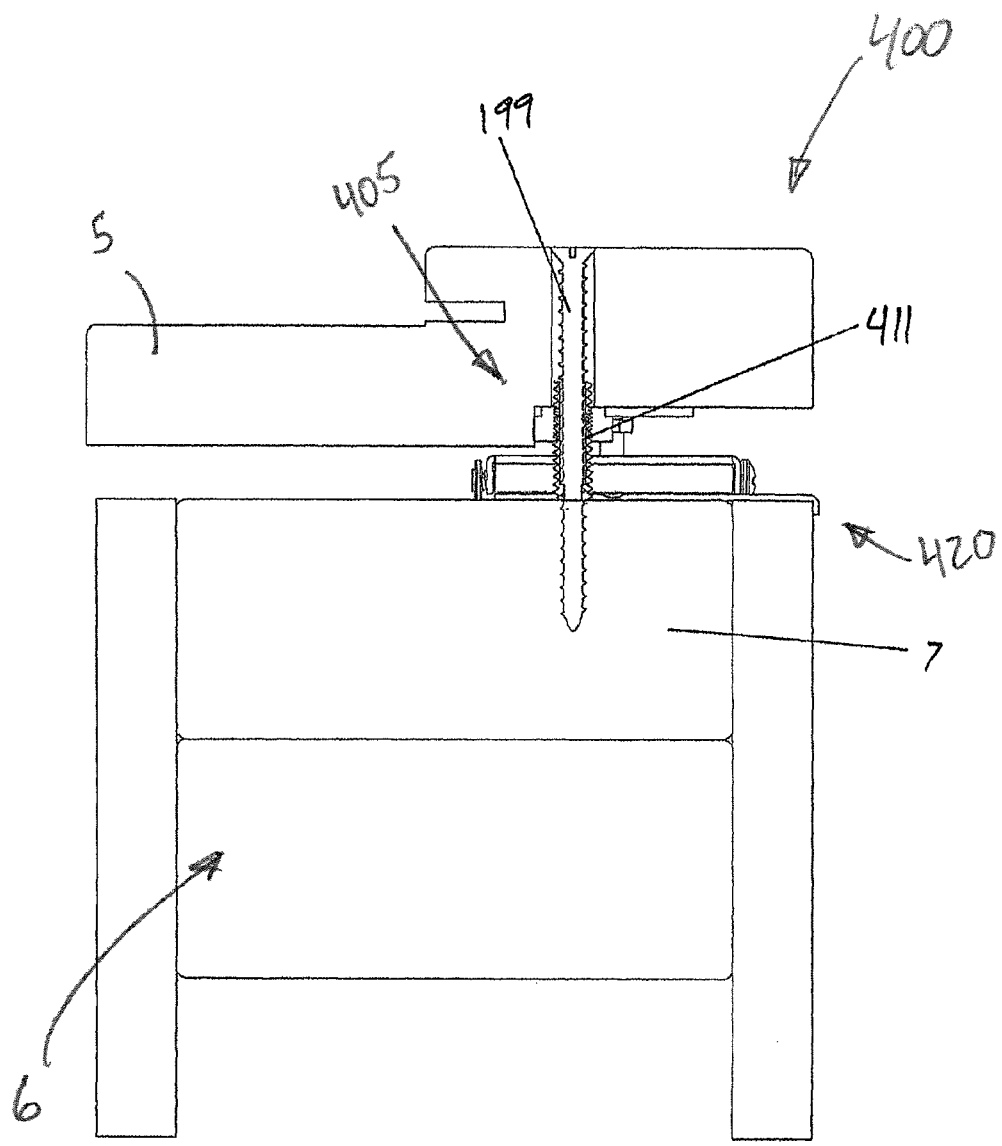
FIG. 39 shows a further view of the section shown in FIG. 38, where a fastener is extended through the spacer and into a framing member.

FIG. 37 shows the jamb assembly 5 positioned within the rough opening 6 and the jamb bracket 405 and the frame bracket 420 of the device 400 are engaged. The spacer 411 is positioned within the clearance hole 11. The spacer 411 may be extended through the threaded guide 410 to align the jamb assembly 5 relative to the rough opening 6. FIG. 38 shows the spacer 411 extended through the threaded guide 410 and into contact with the framing member 7. FIG. 39 shows the jamb assembly 5 aligned within the rough opening 6 with a fastener 199 extended through the spacer 411 and into the framing member 7 of the rough opening. As shown in FIG. 39, the fastener 199 need not be extended into the clearance hole 11 and into contact with the end of the spacer 411 to secure the jamb assembly 5 to the framing member 7.

The present application discloses exemplary embodiments of devices for aligning and securing a jamb assembly in a rough opening. Any of the assemblies, components, or features of the devices for aligning and securing a jamb assembly in a rough opening can be reversed. That is, any of the assemblies, components, or features shown on the rough opening can be moved to the jamb and any of the assemblies, components, or features shown on the jamb can be moved to the rough opening.

The following exemplary method for aligning a jamb assembly within a rough opening utilizes installations devices such as those discussed herein. In certain embodiments, four separate individual devices are positioned on a vertical portion of a jamb assembly and near separate corners of the jamb assembly. However, it should be understood that the installation devices may be installed at any location around the jamb assembly.

A user may begin the installation and alignment process by providing a clearance hole in a portion of the jamb assembly where the installation device is to be used if one does not already exist, e.g., near each of the four corners. This clearance hole will later receive an installation device such as those disclosed herein. Some of the installation devices disclosed herein facilitate spacing of the door jamb from the rough opening and take the place of traditional shims. These installation devices generally only provide adjustment of the outside facing surface of the jamb assembly in a direction toward or away from the rough opening (see, e.g., FIGS. 1B and 2-13). Other installation devices disclosed herein facilitate adjustment of the location of the door jamb assembly with respect to a vertical plane, in addition to facilitating spacing of the door jamb from the rough opening. Thus, these installation devices provide adjustment of the outside facing surface of the jamb assembly in a direction toward or away from the rough opening and also provide adjustment of the outside facing surface of the jamb assembly in a direction parallel to the rough opening (i.e., in and out of the rough opening) (see, e.g., FIGS. 1C, 1D, and 14-39).

In regards to the installation devices that permit adjustment of the door jamb assembly with respect to the vertical plane (i.e., in and out of the rough opening), the user positions a jamb bracket on the rough opening side of the jamb assembly about the clearance hole and aligns the threaded aperture of the jamb bracket with the clearance hole. The jamb bracket is generally fastened to the jamb assembly with a fastener. A frame bracket is positioned on the rough opening, generally using an optional frame alignment tab, in a location that permits connection of the mating element and the mating tab of a traversing member when the jamb assembly is later positioned within the rough opening. The user generally fastens the frame bracket to the rough opening with a fastener or the like. This process is repeated until the requisite number of devices are positioned (e.g., two, three, four, five, six, etc.). The jamb assembly is positioned within the rough opening and is rotated until the mating elements and mating tabs of the respective brackets engage. If necessary, the user may reposition one or more of the frame brackets or jamb brackets to facilitate engagement of all of the brackets. The user then plumbs the jamb assembly within the rough opening by adjusting each threaded member appropriately (and thus moving the traversing member and the corresponding jamb member).

Once adjusted to lie satisfactorily within the vertical plane of the rough opening, the user will then adjust the gap between rough opening and the rough opening-facing surface of the jamb assembly. This is accomplished by extending a spacer through each clearance hole (and operationally engaging each respective threaded aperture) until the jamb assembly is aligned vertically within the rough opening. Once the jamb assembly is aligned, a fastener is then driven through the hollow portion of each spacer and into, for example, a framing member of the rough opening to secure the jamb assembly within the rough opening.

Although the methods disclosed herein have been described with a particular order of steps, any one or more of the steps may be omitted and/or the order of the steps may be changed without departing from the spirit and the scope of the disclosed methods. Moreover, any one or more of the steps may be carried out manually or via an automated process utilizing various equipment known to those of skill in the art.

It should be understood that the embodiments discussed above are representative of aspects of the invention and are provided as examples and not an exhaustive description of implementations of an aspect of the invention. As used in the description of the invention and the appended claims, the singular forms "a," "an," and "the" are intended to include the plural forms as well, unless the context clearly indicates otherwise. In addition, the recitations of numerical ranges by endpoints include all numbers subsumed within that range (e.g., 1 to 5 includes 1, 1.5, 2, 2.75, 3, 3.80, 4, 5, etc.).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto."

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasably or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

What is claimed is:

1. A device for aligning and securing a jamb assembly within a rough opening, the device comprising:
   a jamb bracket attached to the jamb assembly, the jamb bracket directly comprising a mating element, a jamb contact member, a spacer, and a threaded guide adapted to receive the spacer therethrough, wherein the spacer comprises an open ended hollow cylinder with a threaded outer diameter; and
   a frame bracket attached to the rough opening, the frame bracket directly comprising a base member, a threaded member, at least one threaded member retainer extending from the base member, a traversing member having a threaded inner surface that threadably engages a threaded outer surface of the threaded member, and a mating tab that mates with the mating element of the jamb bracket; and
   wherein the threaded member is configured to rotate about a traversing member path, and wherein, rotating the threaded member moves the traversing member along the traversing member path and moves the jamb assembly relative to the rough opening.

2. The device of claim 1, wherein the threaded outer surface of the spacer is adapted to engage an inner surface of the threaded guide.

3. The device of claim 1, wherein the spacer is adapted to permit a length of a fastener to extend therethrough.

4. The device of claim 3, wherein an end of the spacer is adapted to prevent an entire length of the fastener from extending through the spacer.

5. The device of claim 1, wherein the frame bracket comprises a frame alignment tab extending from the base member.

6. The device of claim 1, wherein the frame bracket comprises first and second threaded member retainers.

7. The device of claim 1, wherein a first adjustment portion of the device comprises the threaded guide and the spacer of the jamb bracket, and wherein the first adjustment portion is configured to provide selective adjustment of the jamb assembly in a first direction relative to the rough opening.

8. The device of claim 7, wherein a second adjustment portion of the device comprises the traversing member and the mating tab of the frame bracket and the mating element of the jamb bracket, and wherein the second adjustment portion is configured to provide selective adjustment of the jamb assembly in a second direction relative to the rough opening while still permitting movement of the jamb assembly in the first direction relative to the rough opening.

9. The device of claim 1 wherein the mating tab extends from an outer surface of the traversing member.

10. The device of claim 1 wherein the mating element comprises a slot that receives the mating tab and that extends perpendicular to the traversing member path.

11. The device of claim 6 wherein the first and second threaded member retainers both retain the threaded member.

12. A device for aligning and securing a jamb assembly within a rough opening, the device comprising:
   a jamb bracket comprising a mating element, a jamb contact member, and a threaded guide adapted to receive a spacer therethrough, wherein the spacer comprises an open ended hollow cylinder with a threaded outer diameter; and
   a frame bracket comprising a base member, a threaded member, at least one threaded member retainer extending from the base member, a traversing member having a threaded inner surface adapted to threadably engage a threaded outer surface of the threaded member, and a mating tab adapted for mating with the mating element of the jamb bracket;
   wherein the threaded member is configured to rotate about a traversing member path,
   wherein the traversing member moves along the traversing member path as the threaded member rotates,
   wherein a first adjustment portion of the device comprises the threaded guide and the spacer of the jamb bracket, and the first adjustment portion is configured to provide selective adjustment of the jamb assembly in a first direction relative to the rough opening,
   wherein a second adjustment portion of the device comprises the traversing member and the mating tab of the frame bracket and the mating element of the jamb bracket, and the second adjustment portion is configured to provide selective adjustment of the jamb assembly in a second direction relative to the rough opening while still permitting movement of the jamb assembly in the first direction relative to the rough opening, and
   wherein the first direction is substantially perpendicular to the second direction.

* * * * *